A. VANNUCCI.
TIN DOUBLING MACHINE.
APPLICATION FILED FEB. 11, 1920.
1,355,720.
Patented Oct. 12, 1920.
15 SHEETS—SHEET 1.
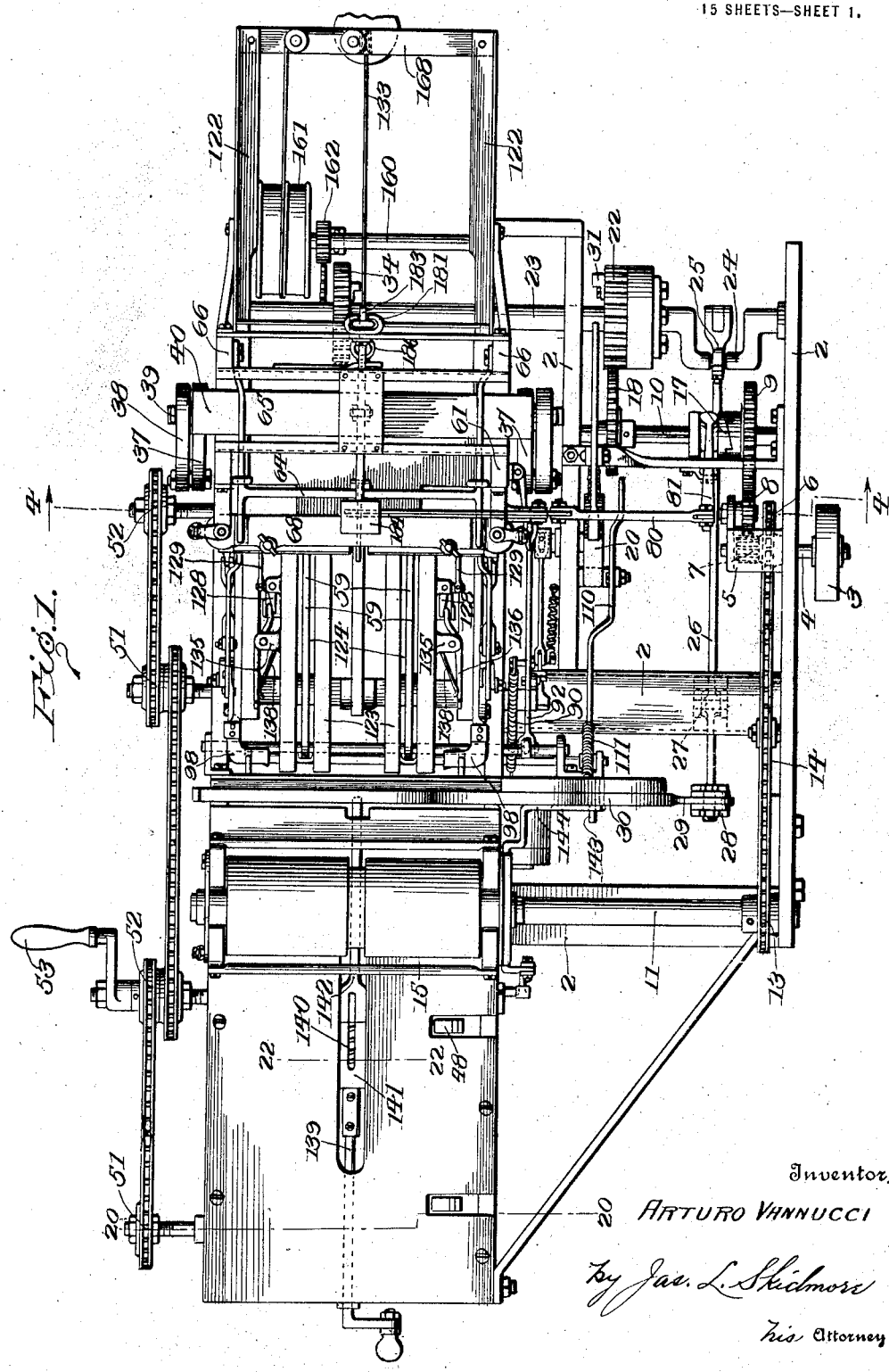
Inventor,
ARTURO VANNUCCI
By Jas. L. Skidmore
His Attorney.

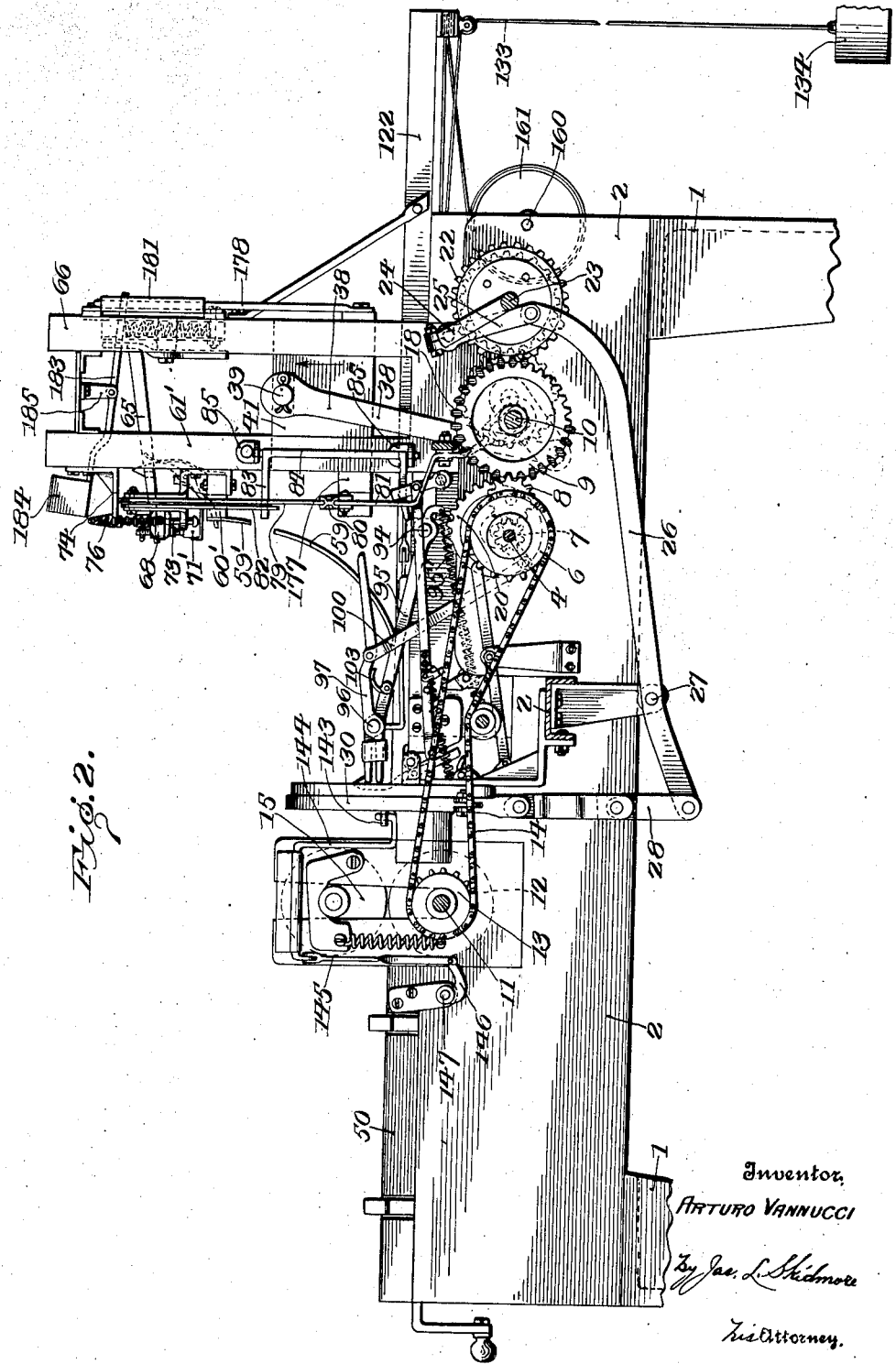

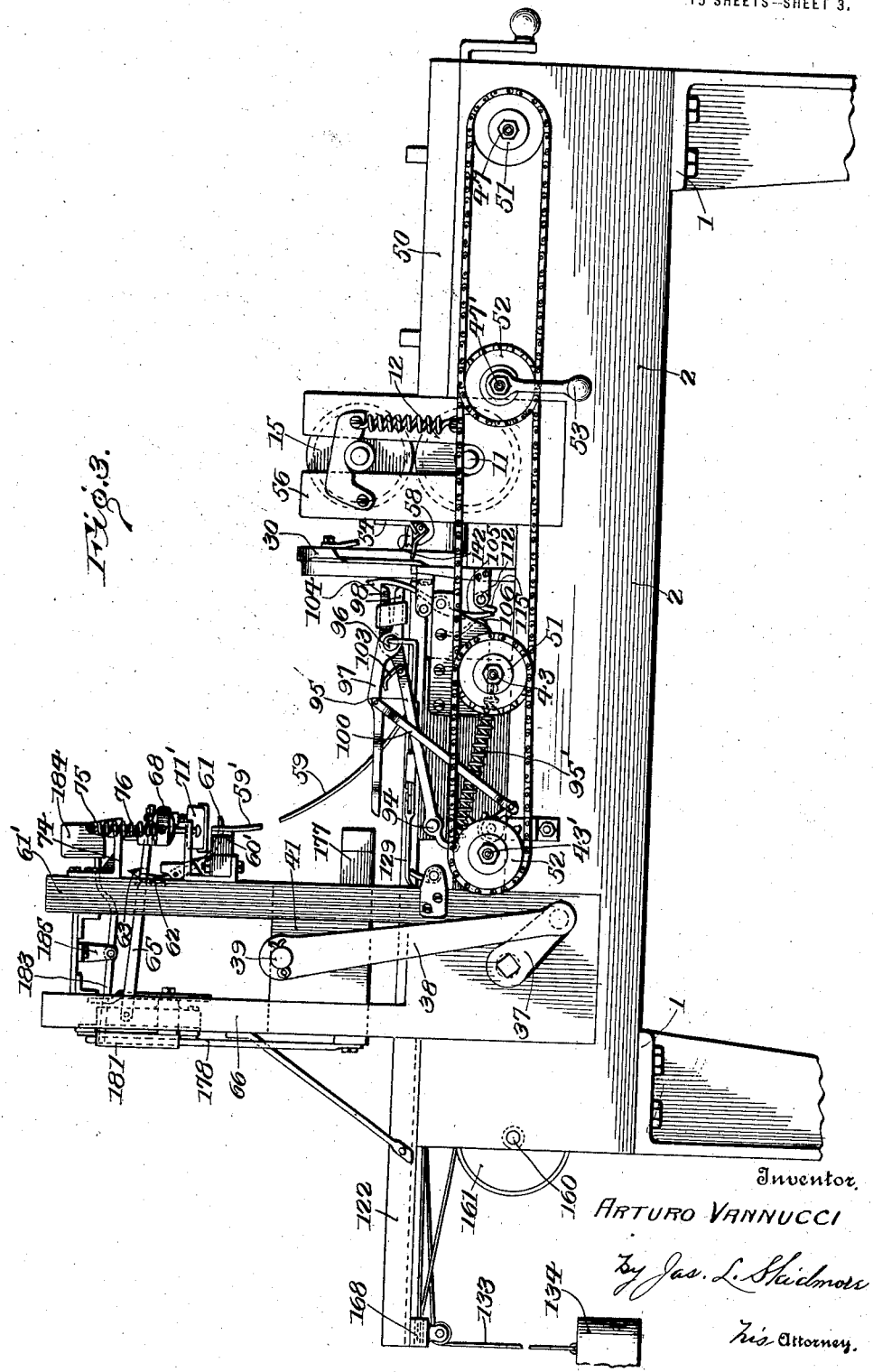

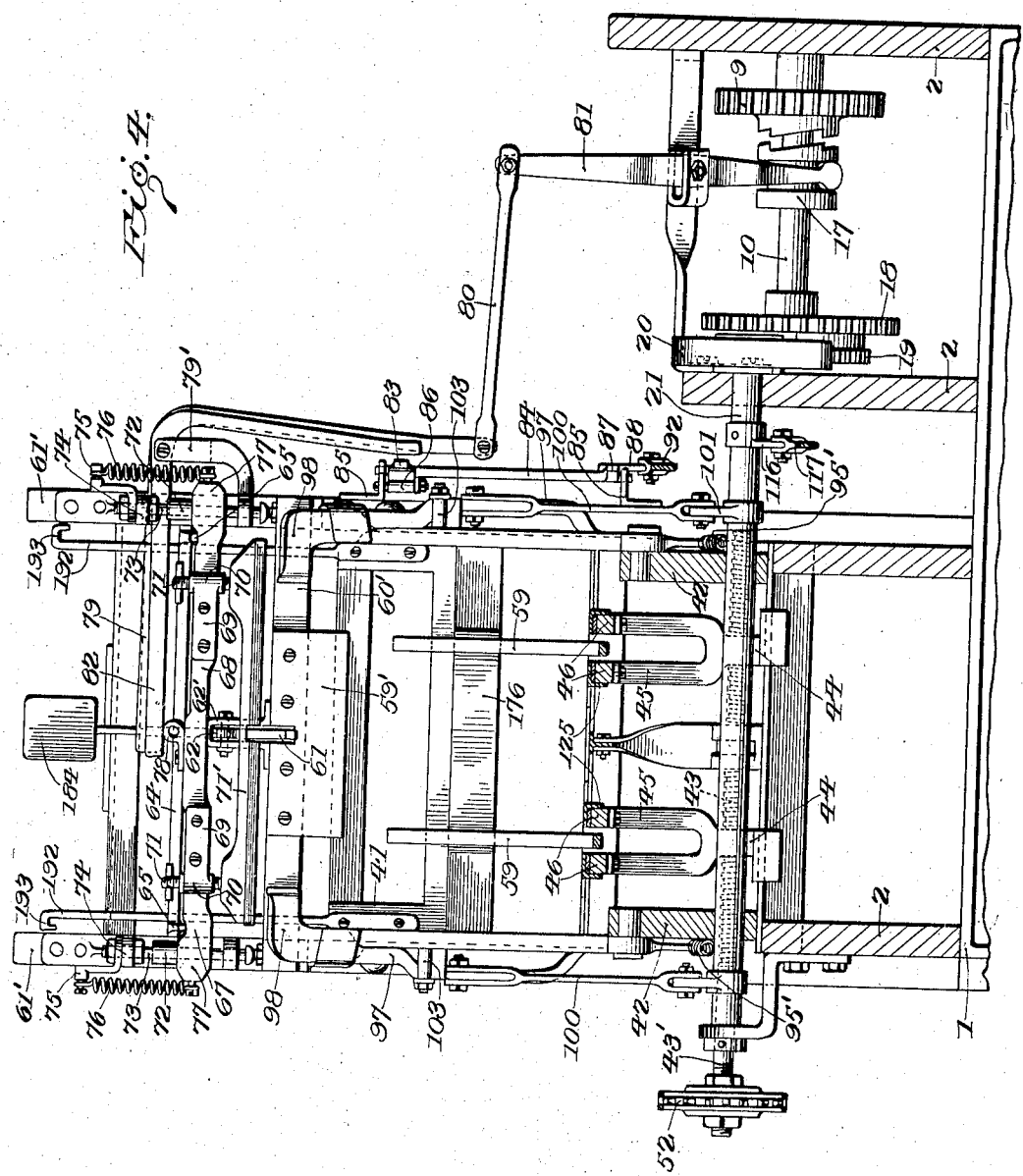

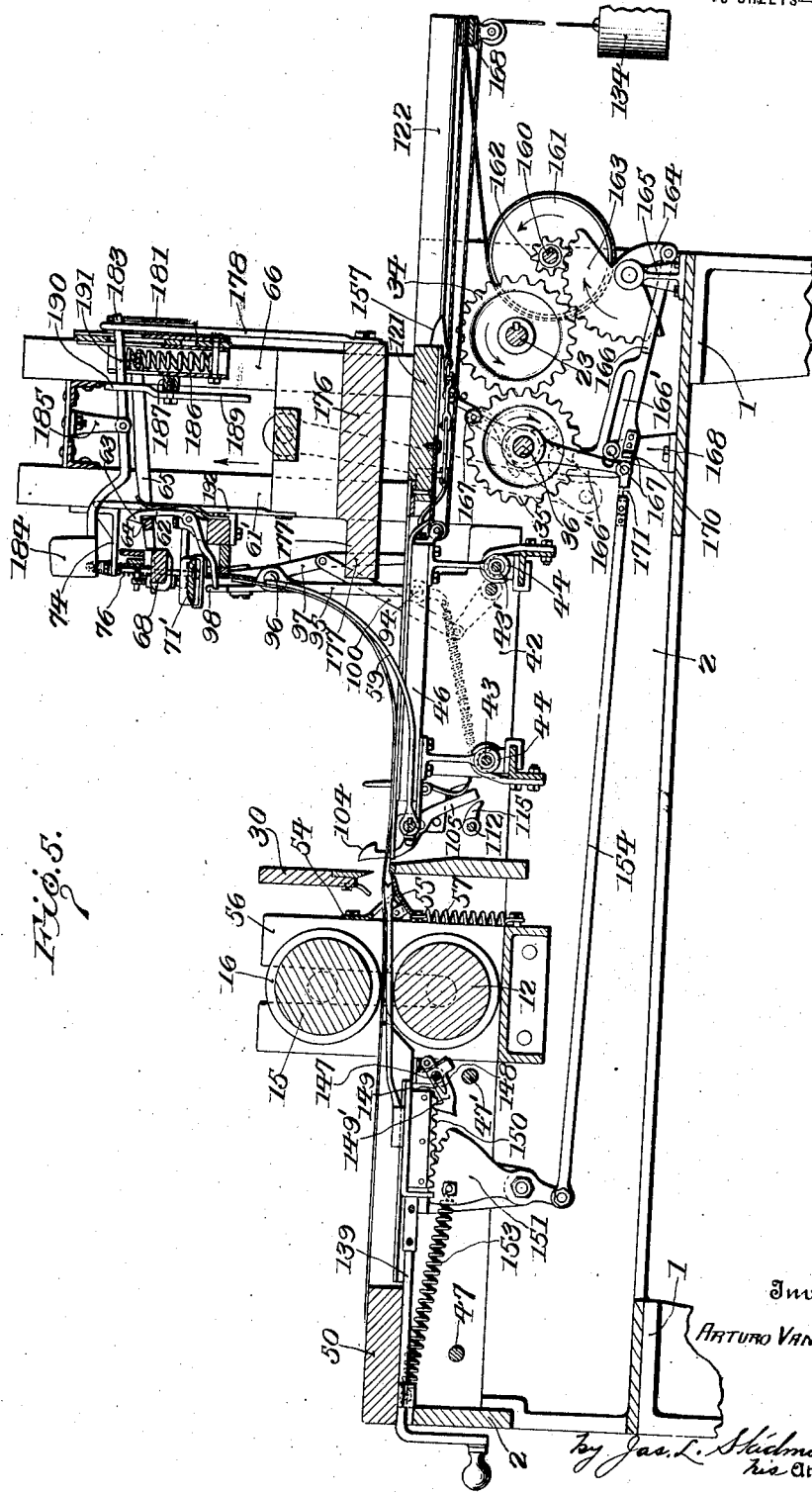

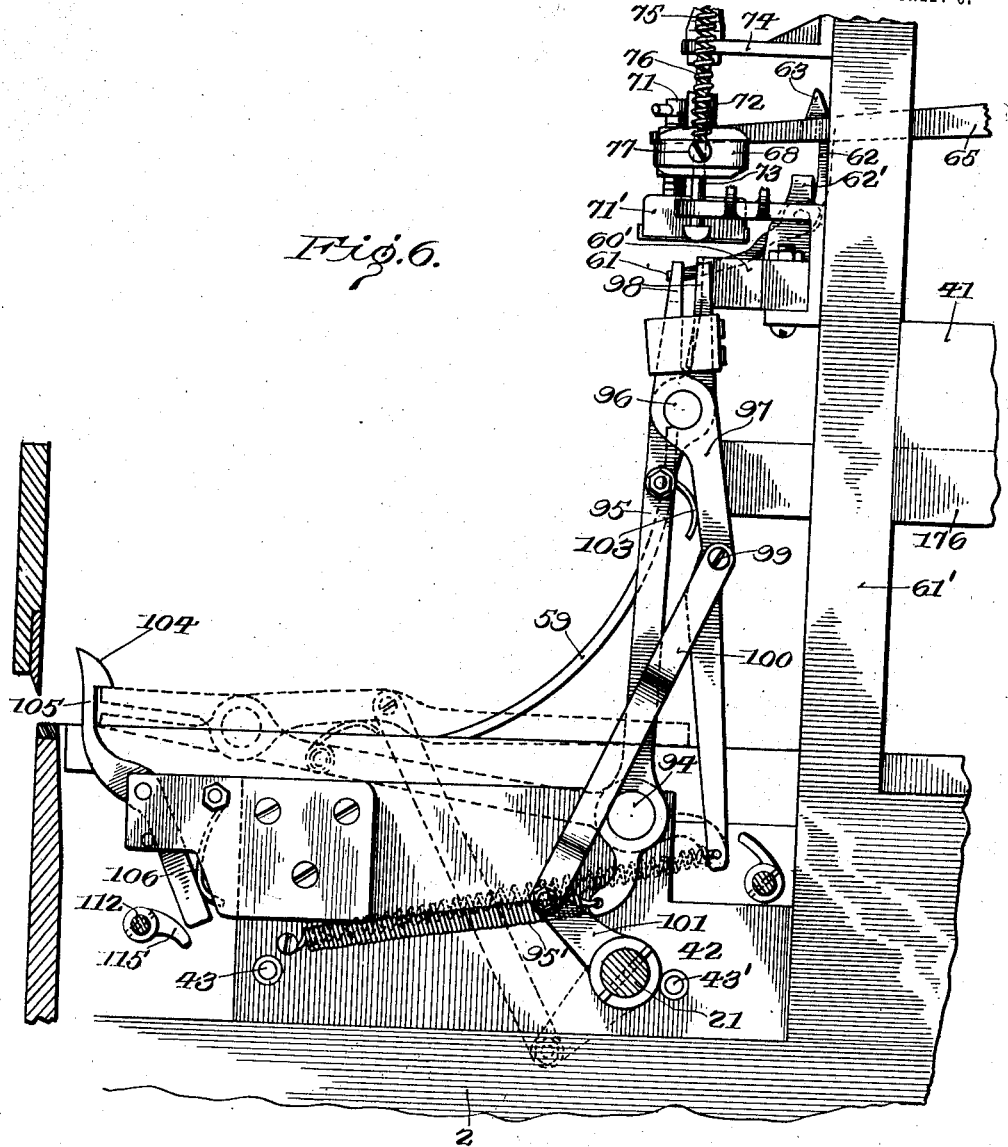

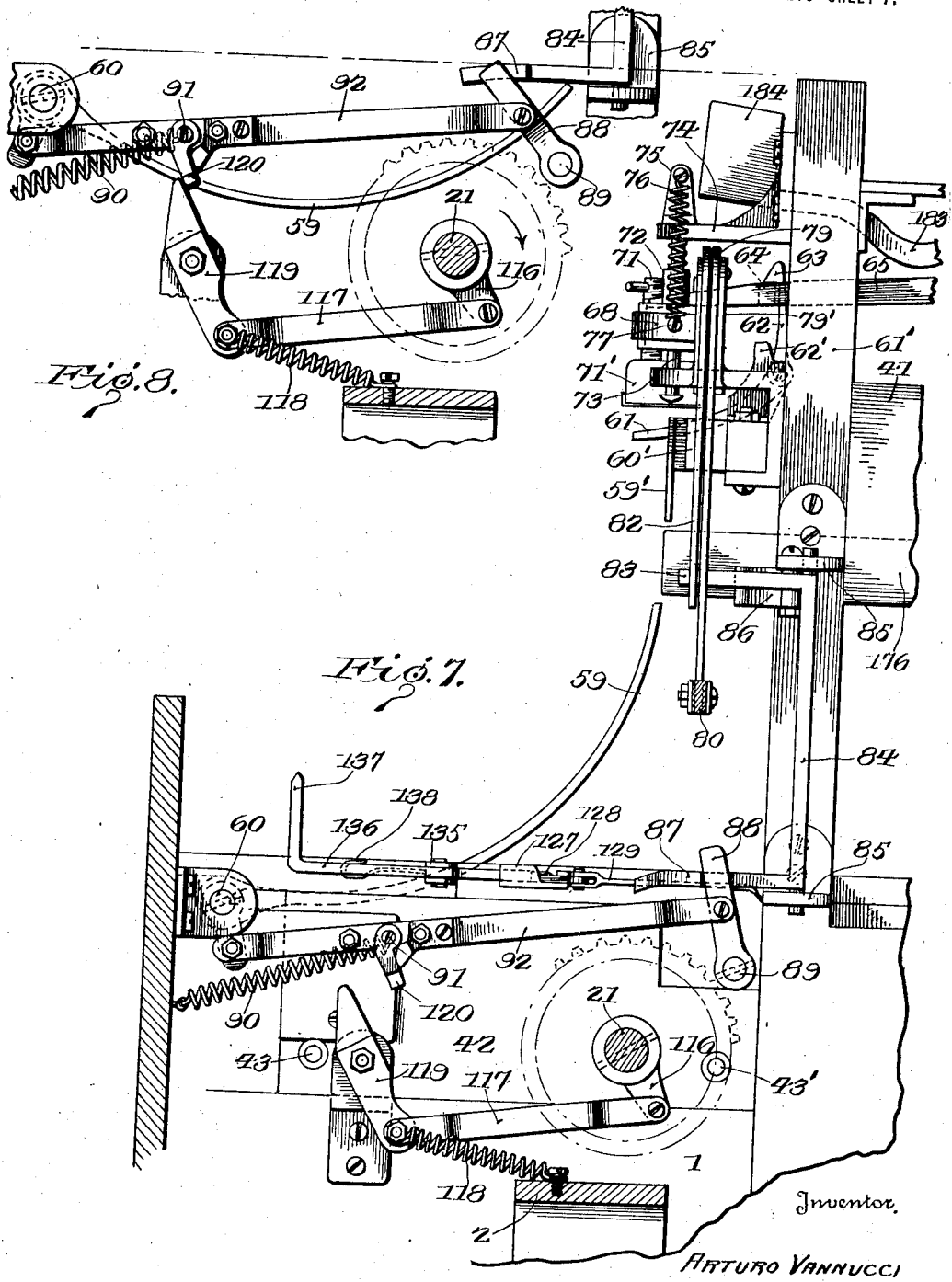

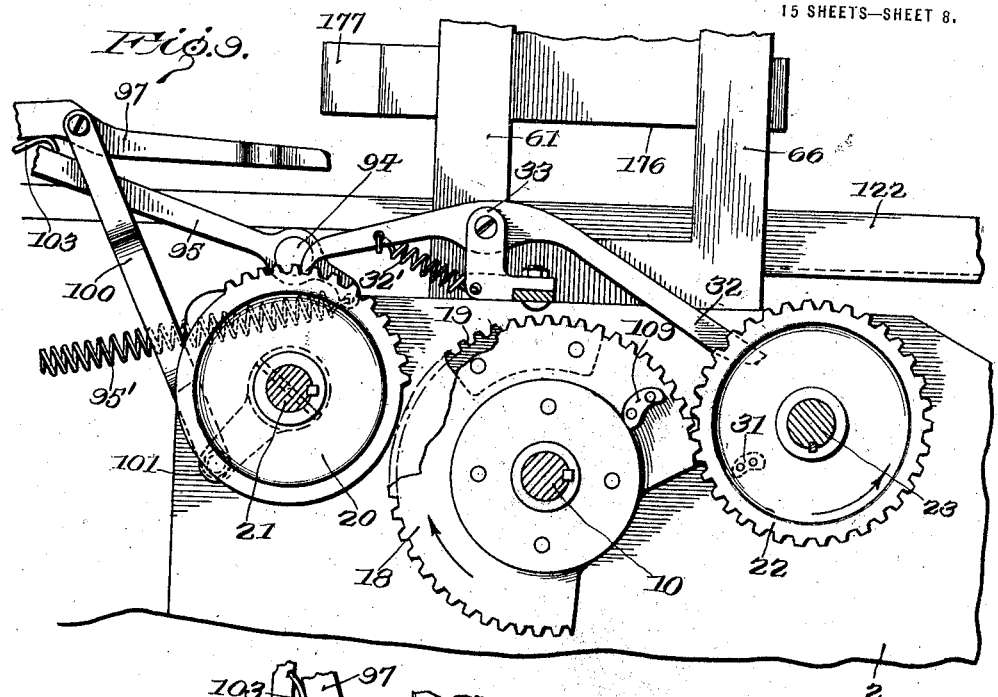
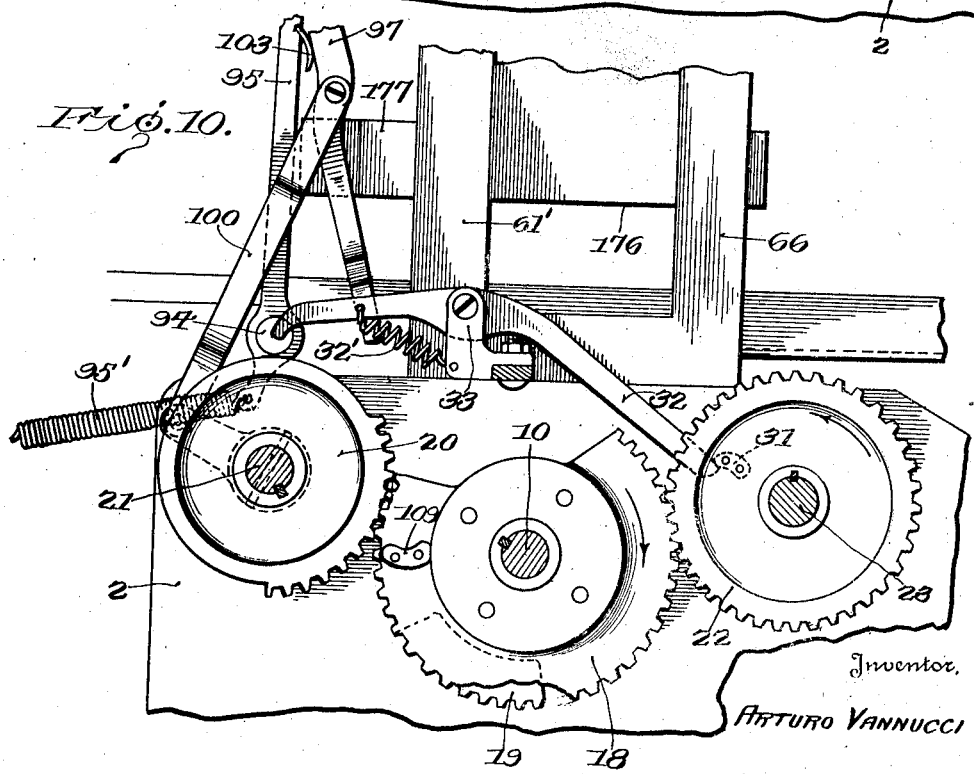

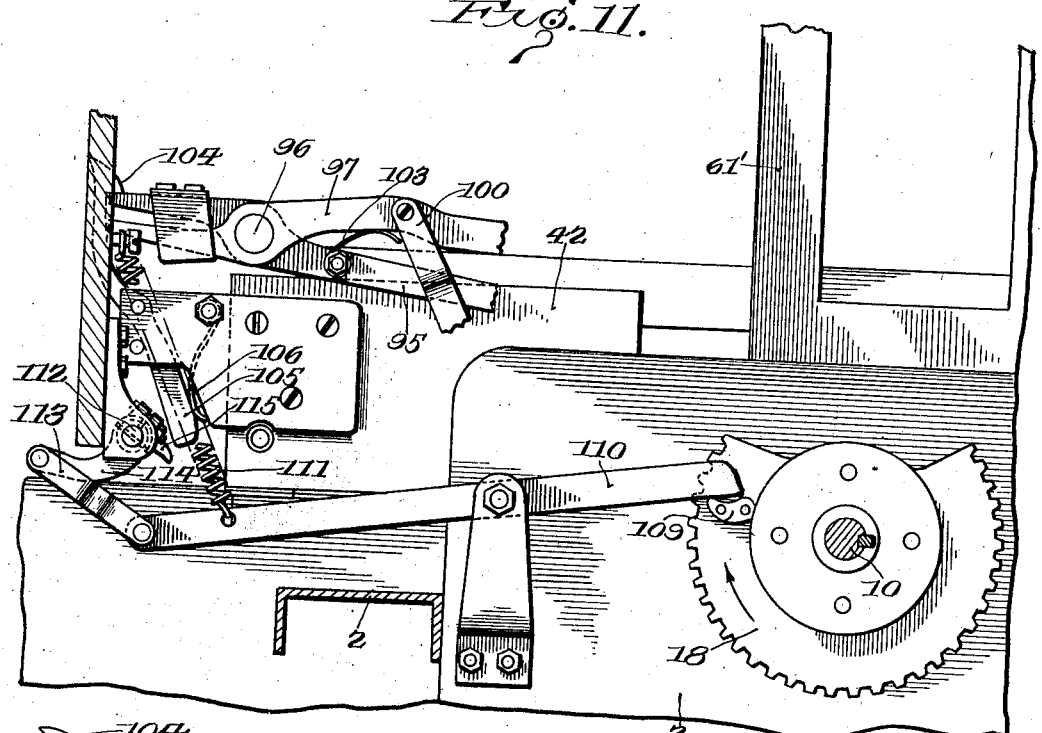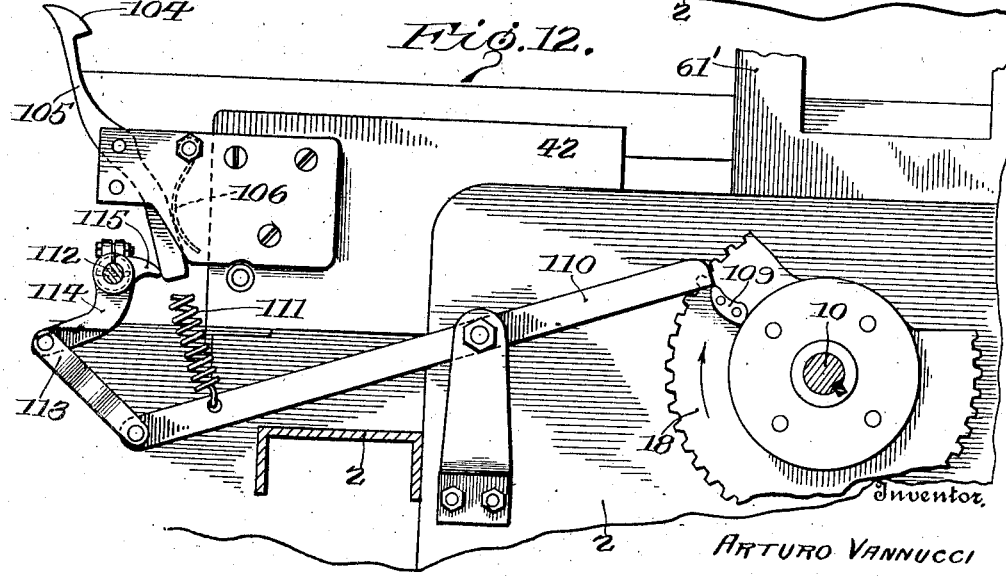

A. VANNUCCI.
TIN DOUBLING MACHINE.
APPLICATION FILED FEB. 11, 1920.

1,355,720.

Patented Oct. 12, 1920.
15 SHEETS—SHEET 10.

Inventor,
ARTURO VANNUCCI
by Jas. L. Skidmore
His Attorney.

A. VANNUCCI.
TIN DOUBLING MACHINE.
APPLICATION FILED FEB. 11, 1920.

1,355,720.

Patented Oct. 12, 1920.
15 SHEETS—SHEET 11.

Inventor,
ARTURO VANNUCCI

By Jas. L. Skidmore
his Attorney.

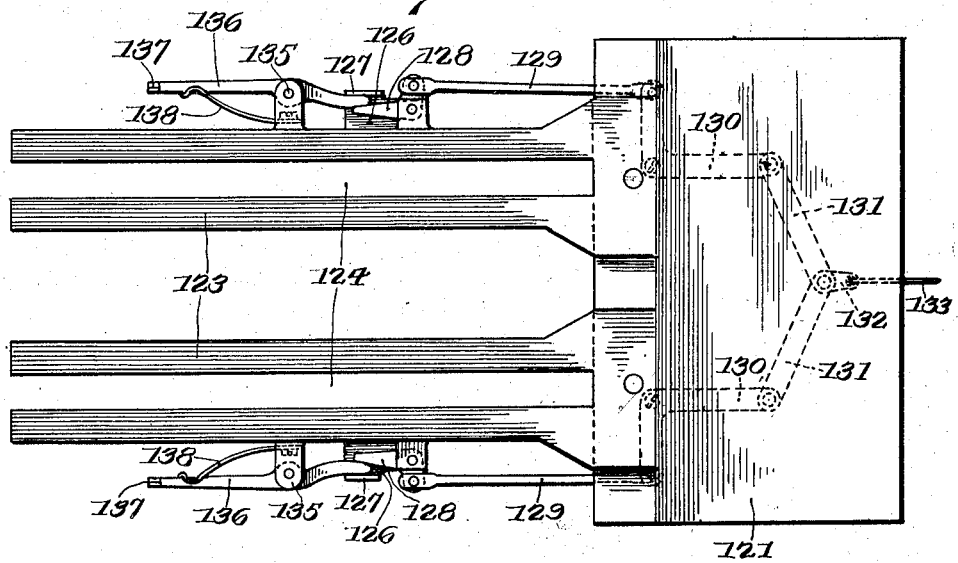
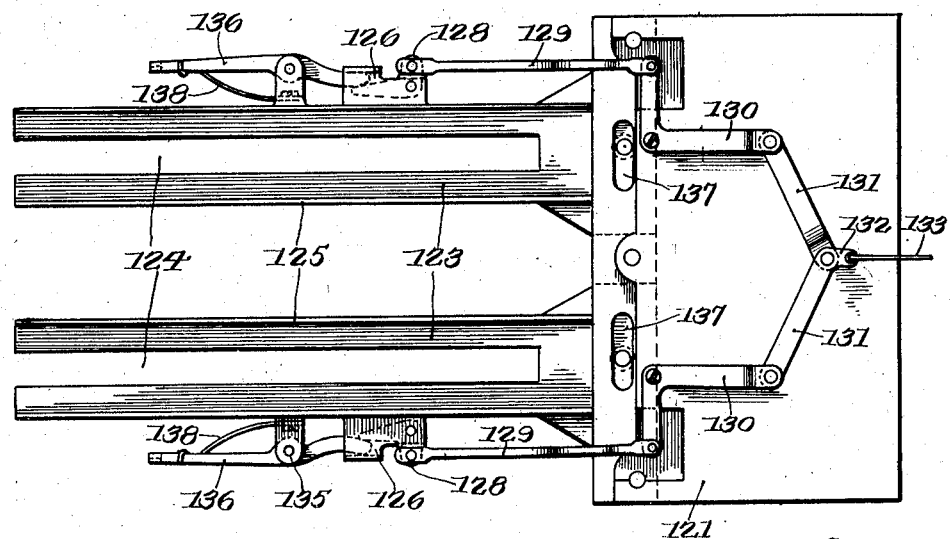

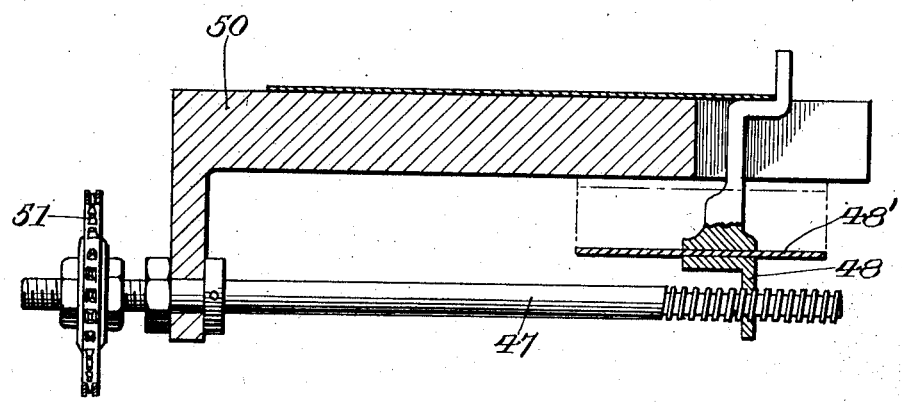
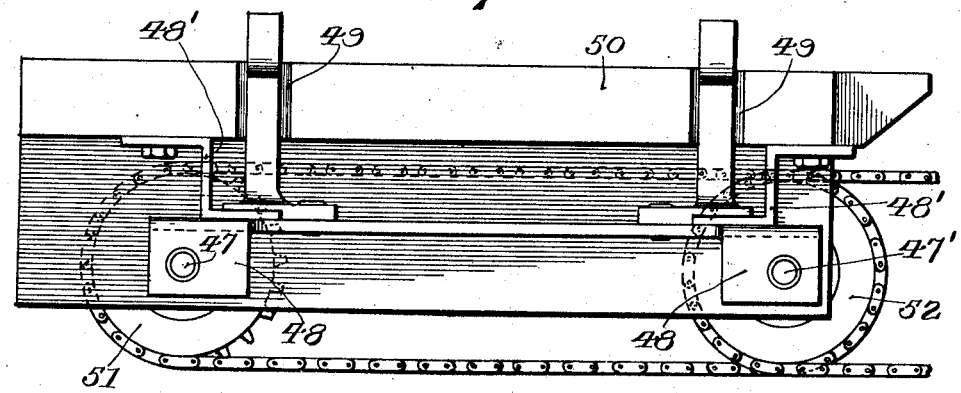
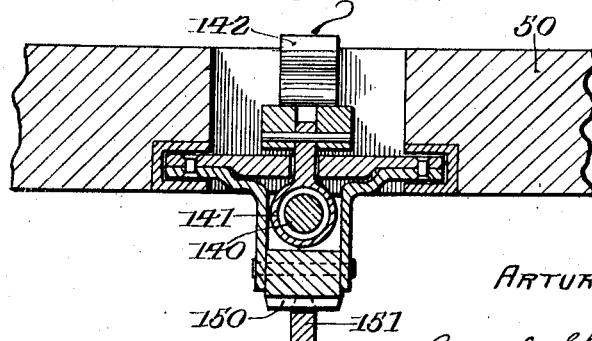

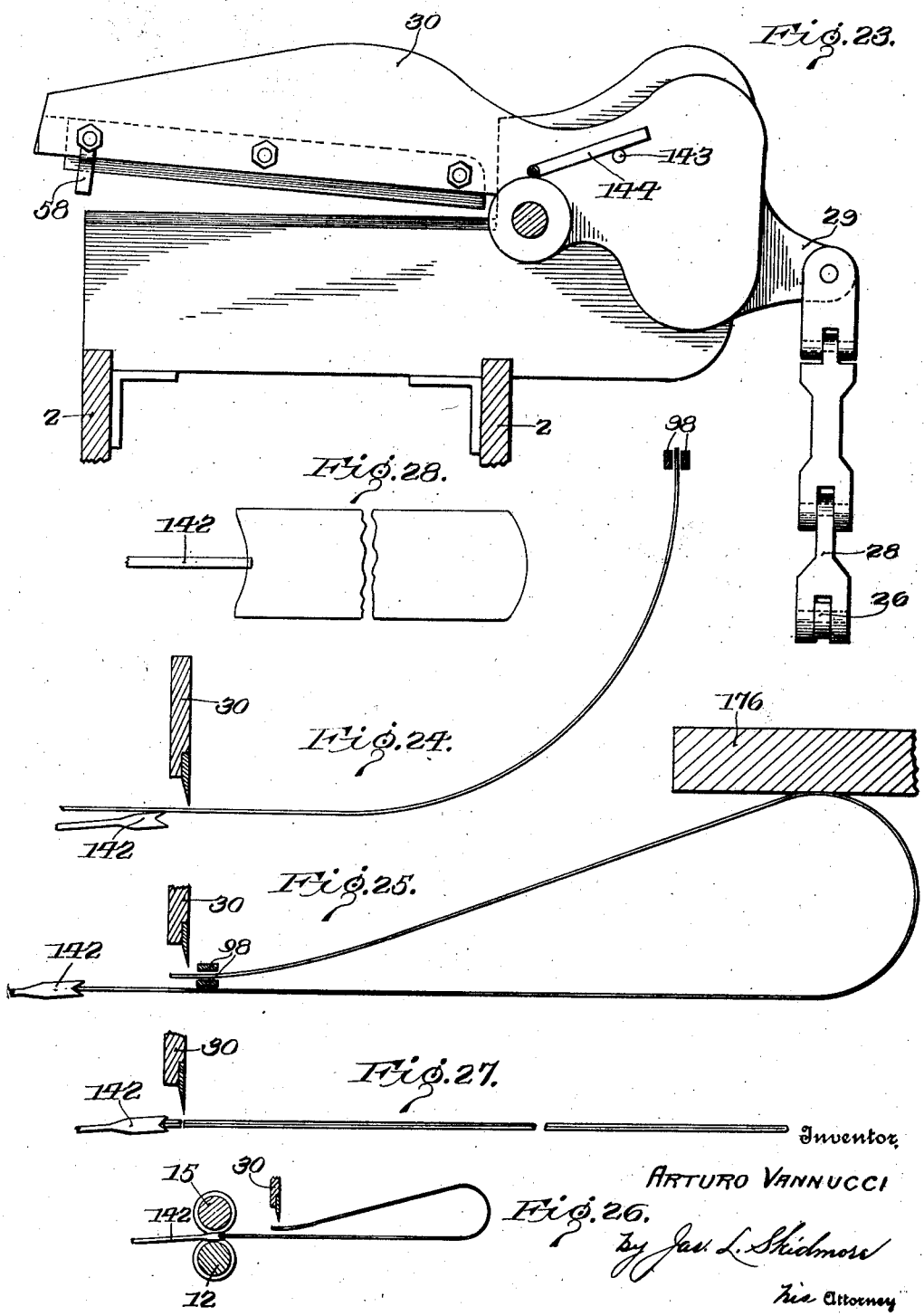

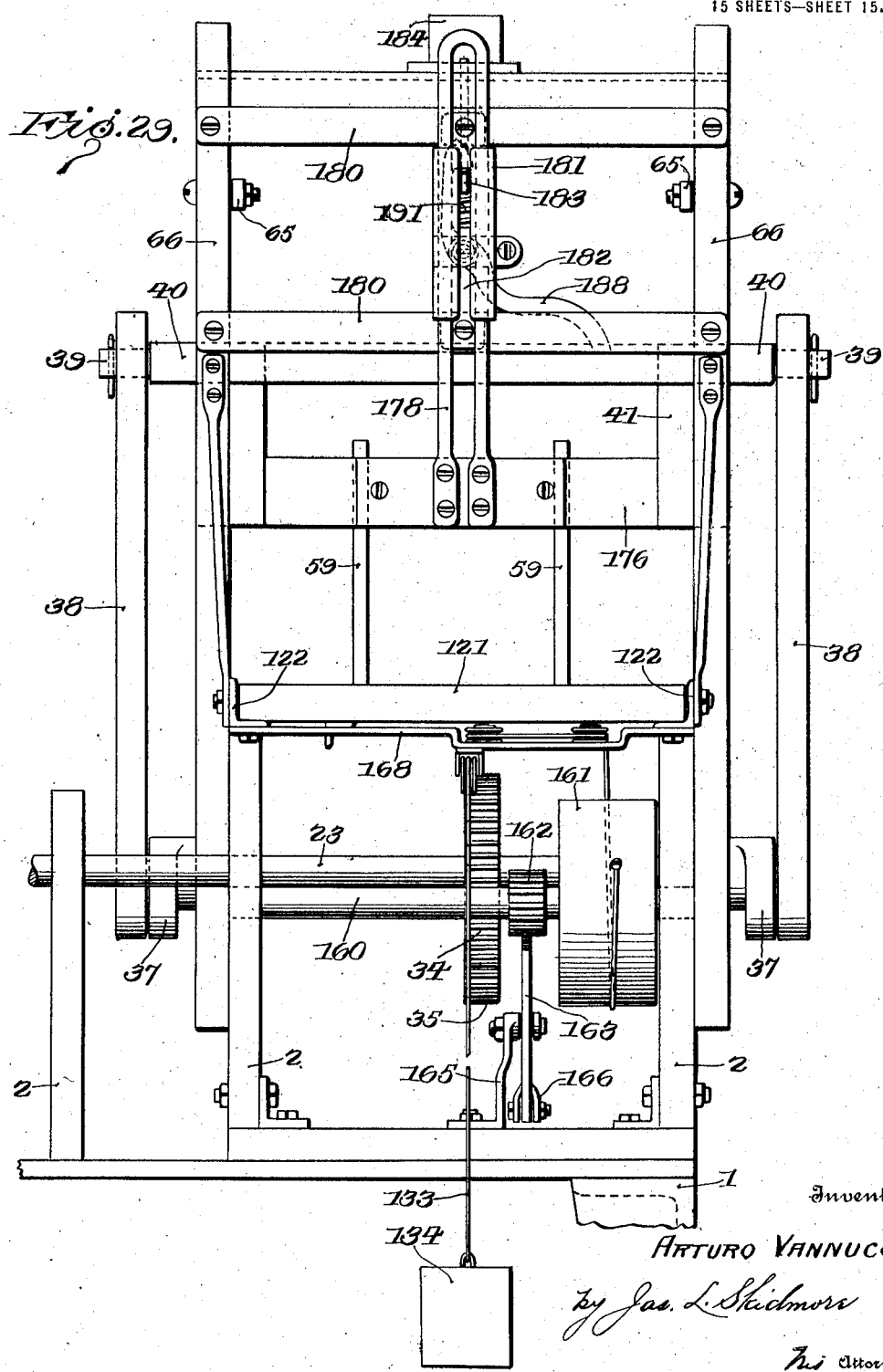

UNITED STATES PATENT OFFICE.

ARTURO VANNUCCI, OF BELLE VERNON, PENNSYLVANIA, ASSIGNOR OF ONE-HALF TO EZIO BONARI, OF MONESSEN, PENNSYLVANIA.

TIN-DOUBLING MACHINE.

1,355,720.  Specification of Letters Patent.  Patented Oct. 12, 1920.

Application filed February 11, 1920. Serial No. 357,891.

*To all whom it may concern:*

Be it known that I, ARTURO VANNUCCI a subject of the Kingdom of Italy, residing at Belle Vernon, in the county of Fayette and State of Pennsylvania, have invented certain new and useful Improvements in Tin-Doubling Machines, of which the following is a specification.

This invention relates to automatically operated means for folding or doubling metal sheets or packs, and is especially designed for the purpose of automatically doubling tin sheets or packs which are then delivered to the heating furnace.

The main object of this invention is to provide durable and efficient automatically operated mechanism for doubling tin sheets after they are passed from the rolling mill, thereby dispensing with the expensive manual labor heretofore generally employed in the performance of this doubling operation.

A further object of the invention is to so construct my improved and novel mechanism as to accurately double the sheets and true up their opposite edges, at the same time avoiding the usual waste of material which ordinarily occurs in the doubling operation, thereby reducing such waste to a minimum.

Another object of the invention is to employ means for automatically feeding the sheet to the folding mechanism, so that said sheet is adapted to automatically operate clutching means for starting the folding or doubling operation.

Further objects of the invention are to provide means for gaging and regulating the amount of material to be sheared from both the ragged and rounded end portions of the sheet; pincher or gripping means for clamping each side edge of the sheet; curved resilient means for guiding the sheet upward; means for operating said gripping and resilient means; a pressing frame or platen for compressing the sheet in its doubled condition; means for operating said pressing frame; means for turning the edges of the folded sheet; horizontally movable means for ejecting the sheet rearwardly; means for returning said movable means to its normal position; shearing means, and means for periodically throwing the doubling mechanism out of operation, all of said means and mechanism being wholly automatic in their operation.

The foregoing and such other objects as may appear from the ensuing description are attained by the construction, arrangement, location, combination and coöperation of the parts hereinafter more fully described, illustrated in the accompanying drawings, and particularly pointed out in the claims appended hereto, it being understood that slight changes in the precise form, proportions and minor details of the construction may be resorted to without departing from the spirit or sacrificing any of the advantages of the invention.

Reference now being had to the accompanying drawings which form a part of this specification and in which similar numerals of reference indicate like parts throughout the several views, it will be seen that:—

Figure 1, is a plan view of the novel mechanism embodying my invention.

Fig. 2, is a side elevation of one side of the mechanism, shown partly in section.

Fig. 3, is a side elevation of the other side of the mechanism.

Fig. 4 is a sectional elevation taken on the line 4—4, Fig. 1, looking in the direction of the arrow.

Fig. 5, is a central longitudinal section.

Fig. 6, is a detail side elevation of the pinching mechanism showing the relative position of the shearing means.

Figs. 7 and 8, are detail sectional side elevations of the mechanism for swinging the curved resilient guide fingers in their up and down positions.

Figs. 9 and 10, are detail side elevations of the pawl-operating mechanism which regulate the action of the pinching mechanism.

Figs. 11 and 12, are detail side elevations of the locking pawl mechanism for holding the pinching jaws in their lowermost position.

Fig. 18, is a top plan of the movable table carrying the tension spring fingers for clamping and truing the edges of the doubled sheet.

Fig. 19, is a bottom plan of the means shown in Fig. 18.

Fig. 20, is an enlarged sectional detail of the adjustable sheet guides taken on the line 20—20, Fig. 1.

Fig. 21, is a detail side elevation of the device shown in Fig. 20.

Fig. 22, is an enlarged detail section taken on the line 22—22, Fig. 1.

Fig. 23, is a detail side elevation of the shearing or severing means.

Fig. 24, is a diagrammatic view showing the early movement of the sheet upward between the pinching jaw, with the shearing blade and the end gaging means indicated.

Fig. 25, is a similar view showing an intermediate step in the movement of the sheet of material with a portion of the presser platen indicated.

Fig. 26, is a similar view on a reduced scale showing the gage bar passed between the feed roller in contact with the forward end of the sheet or jack for pushing the end of the sheet into its proper position with respect to the shearing blades.

Fig. 27, is a diagrammatic view showing the completed or doubled form of the sheet or pack broken away and with both ends sheared and ready to be ejected rearwardly on the slidably movable table.

Fig. 28, is a diagrammatic view showing the form of the sheet or pack broken away, and showing the gage bar in contact with the forward ragged end of said sheet, and Fig. 29, is an enlarged detail rear elevation.

Figure 13:
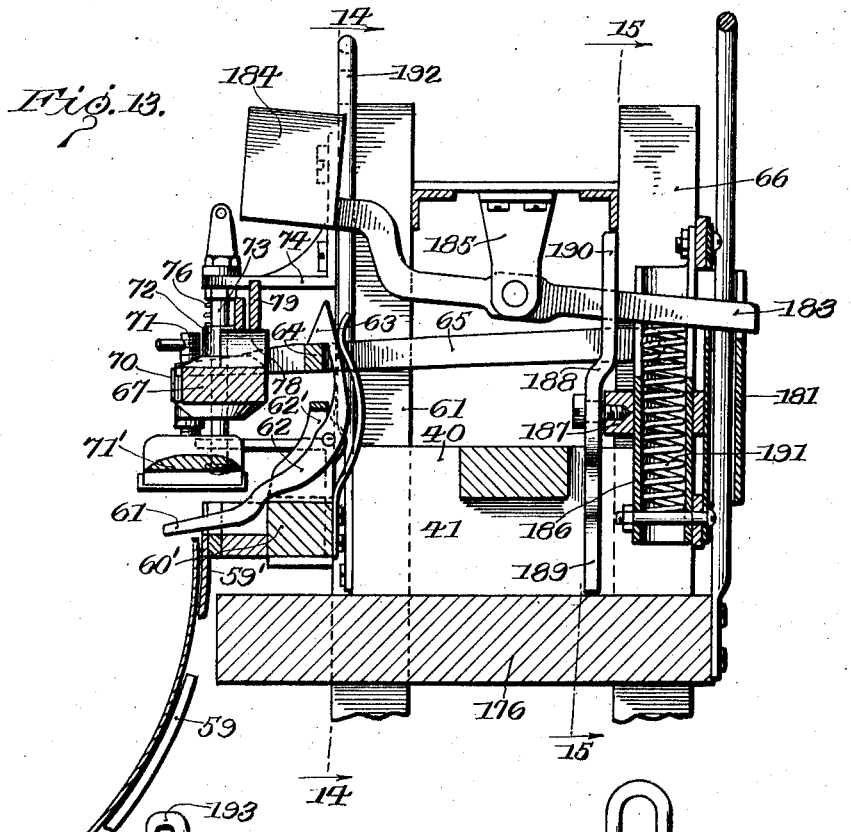
Fig. 13, is an enlarged sectional detail of the means for operating the clutch engaging and disengaging mechanism.
Figure 14:
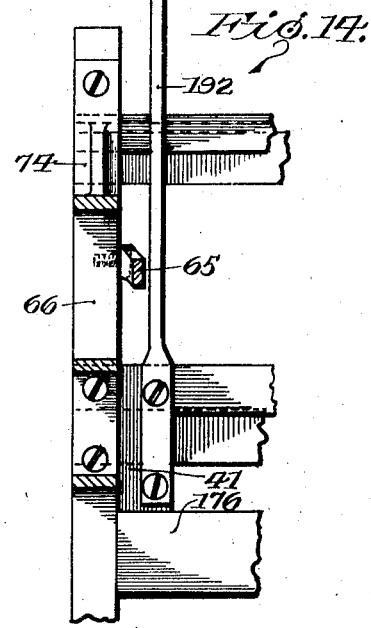
Fig. 14, is a detail section taken on the line 14—14, Fig. 13, looking in the direction of the arrow.
Figure 15:
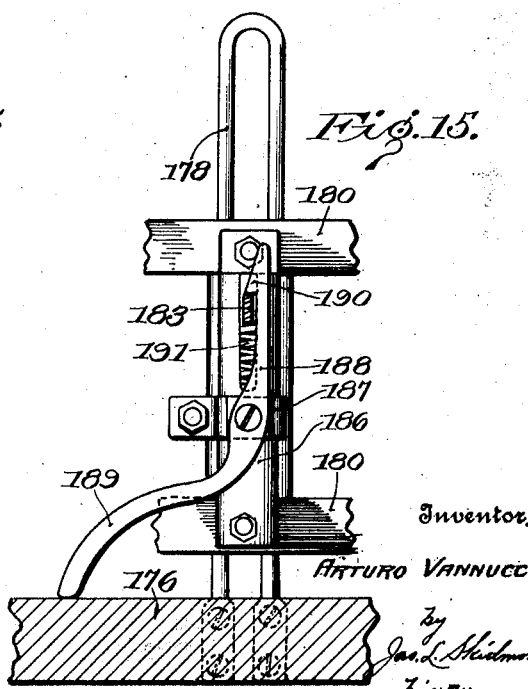
Fig. 15, is a detail section taken on the line 15—15, Fig. 13, looking in the direction of the arrow.
Figure 16:
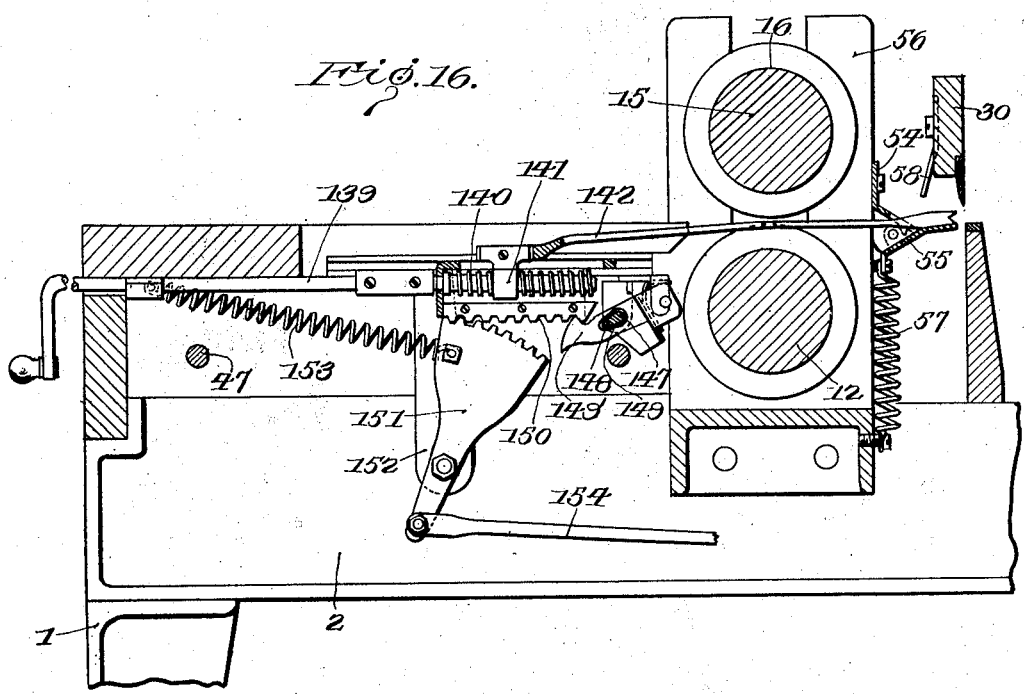
Fig. 16, is an enlarged sectional detail showing the sheet feeding and its end gaging means in connection with the relative position of the shearing means.

In carrying out my invention as illustrated, the numeral 1 indicates any suitable support upon which the framework 2 of my novel means may be properly secured or supported in any desirable manner, and 3 designates a fly or gear-wheel to which is connected in any desirable manner (not shown), an electric motor or any other suitable motive power, said wheel 3 being mounted on a stub driving shaft 4 supported by the framework 2, which latter is provided with an inwardly extending metallic member 5 rigidly secured to said framework and serving as a bearing for the inner end of the shaft 4, said shaft having mounted thereon a sprocket gear 6, and a small gear wheel 7, the latter meshing with an intermediate gear wheel 8 mounted on a small stub shaft carried by the integral extension 8' formed on the member 5, said wheel 8 meshing with a large gear wheel 9 mounted on stub-shaft 10, carried by the framework 2. Mounted within the framework 2 is a revoluble shaft 11 connected to the lowermost feed-roll 12, said shaft being provided near its outer end with a sprocket gear 13 adapted to engage with a sprocket chain 14, which engages with the sprocket gear 6 mounted on the shaft 4, said chain serving to impart a continuous rotary movement to the lower feed roll, which in turn causes a rotary movement to the upper feed-roll 15 which normally rests in yielding contact with the lower feed roll, as shown in Fig. 2, each of said feed rolls being provided with a central annular groove or recess 16 for the reception of the forward end portion of the gaging means for the ragged edge of the sheet for the purpose hereinafter described.

It will be understood that the fly-wheel 3 revolves continuously, that is, so long as the motive power is communicated thereto, and communicates such continuous revolution to the feed rolls by means of the sprocket wheels and chain hereinbefore referred to, but the doubling mechanism is operated only when the clutch carried by the stub-shaft 10 is in engagement, said clutch being periodically and automatically thrown into and out of engagement with the driving means, in the manner hereinafter described.

The clutch member 17 of any suitable or well known construction is adapted to slide laterally into and out of engagement on the shaft 10, as clearly shown in Figs. 1 and 4, and near the inner end of the stub-shaft 10 is fixedly secured a large segmental mutilated gear 18 having formed on its inner face or fixedly secured thereto a laterally extending smaller segment gear 19 (see Figs. 9 and 10), which is adapted to periodically engage and mesh with a segmental gear 20 fixedly secured to one end of the rock shaft 21 which is supported by the framework 2, while the large segmental mutilated gear 18 is adapted to engage and mesh with the gear wheel 22 fixedly secured to a main driving crank-shaft 23 suitably supported within the framework, the crank portion 24 of the shaft 23, having suitably secured thereto a link member 25 pivotally secured to one end of a metallic bar 26, the latter being pivotally supported to the under side of a portion of the frame-work at 27, the other end of said bar 26 being secured to a depending rigid link member 28 rigidly secured to the outer end of a fixed extension 29 carried by the movable shearing blade 30, said crank-shaft thereby imparting at properly timed periods the required motion to the shearing blade 30 for shearing and severing the ragged edges from the metal sheet. The inner face of the gear wheel 22 is provided with a fixed lateral extension 31, see Figs. 9 and 10, adapted to periodically engage one end of a spring-pressed pawl 32, pivotally secured to the upright portion of a metallic brace member 33 fixedly secured to the frame-work, and throw the other end of said pawl out of engagement with the segmental gear 20 for the purpose hereinafter described. Fixedly secured to the shaft 23, is a gear wheel 34 which meshes with a gear wheel 35, the latter being fixedly secured to a shaft 36 suitably supported by the frame-work, in horizontal alinement with shaft 23, and to each outer end portion of said shaft 36 is rigidly secured one end of a crank arm 37, see Figs. 1, 5 and 29, and to the other end of each crank arm is pivotally secured one end of a vertically extending connecting bar or link 38, the other end of each bar or link 38 being pivotally secured to a fixed pin 39 extending laterally from each end of the transverse bar 40 forming the upper central portion of the reciprocating compressing frame 41.

Suitably supported upon and carried by the main frame-work 2 is an auxiliary frame 42 which supports a plurality of right and left screw-threaded shafts 43, 43', and to each of said shafts is movably secured the screw-threaded hub portion 44 of a plurality of upwardly extending integral members 45, and to each of said upright members is secured a longitudinal bar 46, adapted to form a suitable support for the front end portion of a movable table hereinafter described, while supported within the front portion of the frame-work are a plurality of shafts 47, 47', screw-threaded at one end thereof, and adapted to have threaded engagement with an upright guide member 48, which projects through an opening 49 formed in the top member 50 removably secured to the frame-work, each of said members 48 being slidably secured to a fixed bracket 48'.

To one end of each of the shafts 43 and 47 is fixedly secured two sprocket wheels 51, and to one end of each shaft 43' and 47' is secured a single sprocket wheel 52, said sprocket wheels being adapted to engage with a plurality of sprocket chains, so that when the handle 53 secured to the end of shaft 47' is operated, all of the said threaded shafts will be operated in unison which will serve to cause each side member of the frame 42, and each upright member 45 to be further separated from each other or moved closer to each other dependent upon whether the handle 53 is turned to the right or left, and at the same time the threaded end of each shaft 47, 47' will cause each upright guide member 48 to be moved inward, thereby adjusting the mechanism for use in connection with a wider or narrower sheet of metal which is to be doubled as will be readily understood by reference to Figs. 1, 3, 4, 20 and 21.

The metal sheet or pack is fed to the doubling mechanism between a fixed metallic plate 54 and a pivoted metallic plate 55, both of said plates being secured to a stationary upright 56 supported by the frame-work, and secured to the central portion of the pivoted plate 55, is one end of a coiled spring 57 adapted to restore said plate to its normal position after it has been depressed by contact with the fixed depending projection 58 carried by the movable shearing blade as hereinafter described. The metal sheet moves upwardly and rearwardly into contact with the rearwardly and upwardly curved resilient arms 59, rigidly secured to a rocking shaft 60, said resilient arms being pressed rearwardly by contact with the said sheet, and at the same time guiding the sheet upwardly into contact with the front face of a depending metal plate 59', rigidly secured to the cross-bar 60', said bar 60' being fixedly and suitably secured at each side thereof to the uprights 61', said plate 59' guiding the sheet upward into engagement with the lower extended arm 61 of a pivoted spring pressed pawl 62, carried by a bracket 62' rigidly secured to the bar 60', thereby automatically disengaging the hooked end 63 from engagement with the transversely arranged bar 64, the latter being formed integral with a horizontal bar 65 at each end of the bar 64, each of said bars 65 being pivotally secured at one end to an upright 66, fixedly supported by the frame work, while the other end of each of said bars 65, is fixedly secured to a transversely arranged vertically movable frame 67, consisting of a main cross-bar 68, to the front face of which, at each side of its central portion is fixedly secured a metal member 69, provided with an annular threaded portion 70 for the reception of a threaded rod or pin 71, each rod or pin 71 having threaded engagement with each end portion of a depending gaging bar 71', which projects forwardly slightly in advance of the cross-bar 68, and is provided with a central recess adapted to receive the extended arm 61 of the pawl 62, when the latter is in its disengaged position. The cross-bar 68 is provided with an annular guiding sleeve 72 fixedly secured to the upper surface of said bar 68 near each end thereof, each sleeve 72 being adapted to surround a headed bolt 73, which passes through an opening formed in each end portion of the bar 68, and through each sleeve 72, whereby said frame is properly guided in its up and down movement. The said bolts 73, are each rigidly secured to a bracket member 74 fixedly secured in any suitable manner to uprights 61', and to the outer projecting end portion 75 of each bracket 74 is secured one end of a coiled spring 76, the other end of each spring being fastened to the projecting end portion 77 of the bar 68. Fixedly secured to the upper surface of the bar 68 at its central portion, is a metallic contact member 78 for the purpose hereinafter described.

It will be readily observed that when the hooked end of the spring pressed pawl 62 is in engagement with the bar 64, thereby securing the frame 67 in its lowermost position, as shown in Figs. 4, 6 and 7, the coiled springs 76 are under tension, hence when the metal sheet is fed into contact with the extended lower end portion of the pawl 62 it will force said end portion upward, thereby disengaging the hooked end of said pawl from contact with the bar 64, the tension of the springs thus moving the frame suddenly upward, and causing the contact member 78 to engage with the underside of the overhanging end of member 79 pivotally secured to a bracket 79' fixedly fastened in any suitable manner to one of the uprights 61', whereby the lifting or upward movement of said member 79 will force the clutch member into engagement through the medium of the connecting rod 80 pivotally secured to the lower end of said member 79, and to the upper end of the pivoted clutch shifting lever 81, thereby imparting motion to the doubling mechanism by connection with the power driving means hereinbefore described, and at the same time the contact member 78 will engage with the underside of the overhanging end of member 82, also pivotally secured to the fixed bracket 79', thus elevating said end, and at the same time causing its lower depending end to be swung inward into contact with the upper forwardly extended spring pressed arm 83 formed integral with a rocking member 84, pivotally supported by brackets 85, fixedly secured to the outer face of an upright 61', thereby depressing the flat spring 86, thus permitting an inward rocking or swinging movement of the hooked end portion of the extended arm 87, formed integral with said member 84, which action releases the member 88, rigidly secured to the outer end of a shaft 89, causing said member 88 to swing forward under the tension of a coiled spring 90, one end of which is secured to the frame-work and its other end fastened to projecting end of a fixed pin 91, carried by a metallic connecting link 92, one end of said link being pivotally secured to the member 88, and its other end to a depending member 93, fixedly secured to the rock shaft 60, whereby the release of the member 88 will cause a forward movement of the connecting link 92 imparting a rocking movement of the shaft and causing the curved resilient arms 59, carried by the shaft 60 to assume a position within the frame below the movable table, as shown in Fig. 8.

Pivotally secured at 94, to each side of the auxiliary frame 42, is the rigid member 95 of the pinching or clamping mechanism which will now be described, and secured to the lowermost end portion of each of the members 95, is one end of a coiled spring 95', the other end of said spring being suitably secured to projecting means carried by said frame 42; and pivotally secured to each member 95 at 96, is a movable clamping or pinching member 97, each of said members 95 and 97 being provided with an inwardly extended clamping jaw 98, and pivotally secured to the movable member at 99 is one end of a yoke connecting link 100, the other end of said link being pivotally connected to a member 101, fixedly secured to each end portion of the rock-shaft 21 suitably supported by the frame work, so that when the rocking movement is imparted to the rock-shaft 21, by the segment gear 19, fixedly secured to the inner face of the mutilated gear wheel 18 engaging with the section of gear teeth formed on the gear wheel 20 carried by said rock shaft, it will first cause a forward and downward movement of the member 101, thus through the medium of the yoke link 100, close the movable member 97 against the tension of the plate spring 103 secured to the rigid member 95, thereby causing each side edge of the sheet to be clamped between the clamping jaws, when the further rocking movement of said shaft 21 will impart a forward and downward movement of the pinching or clamping mechanism causing its rigid jaw members to contact with the cam face 104 of the pivoted pawl 105 and rock the pawl forwardly against the tension of the plate spring 106 carried by the auxiliary frame, thereby allowing the jaw members to pass beneath the hooked end portion of said pawl 105 which will immediately spring rearwardly under the tension of said spring 106 and secure the pinching or clamping mechanism in the horizontal position shown by full lines Fig. 11 and by dotted lines Fig. 6, where it will remain held by the hooked end of each pawl 105 against the tension of the coiled springs 95' and by the pivoted pawl 32 engaging with the teeth of the mutilated gear wheel 20 fixedly secured at one end of the rock-shaft 21, said pawl being held in engagement with the teeth by a coiled spring 32', until the doubling of the sheet is completed; the ragged ends of the sheet sheared off, and the doubled sheet moved rearwardly by the horizontally movable table and removed therefrom, when at the proper time, the cam projection or extension 31, fixedly secured to the inner face of the driving gear wheel 22 will contact with the long rear arm of the pawl 32, thereby causing the forward end of said pawl to be disengaged from the gear teeth of the gear wheel 20 against the tension of the spring 95', and substantially simultaneously with the disengagement of the pawl 32, the cam piece 109, fixedly secured to the outer face of the mutilated gear wheel 18 will lift the rear end of the pivoted lever 110 carried by the frame work against the tension of the coiled spring 111 also secured at one end to the frame work, and at its other end to the forward end portion of said pivoted lever 110, which lifting action of the rear end of the lever 110 will impart a rocking movement to the shaft 112, by the link 113 connected to the forward end of the lever 110, and to a depending member 114 fixedly secured to the rock shaft 112, which rocking action causes the cam members 115 rigidly secured to the shaft to engage with the lower depending portion of the pawl 105, thereby rocking the upper hooked end of each pawl 105 forwardly, thus releasing the pinching or clamping mechanism and causing said mechanism to assume its upright or initial position by the tension of the coiled spring 95', (see Figs. 9, 10, 11 and 12) thereby imparting a reverse rocking movement to the rock shaft 21, which causes the depending member 116 fixedly secured to the rock shaft 21 to move forwardly, communicating a forward movement to the link 117 pivotally connected to said member 116, under the tension of the coiled spring 118, connected at one end to a projection carried by the frame-work and at its other end to the forward end of the link 117, said forward end of link 117 being pivotally connected to the lower end of a member 119 pivotally supported to a projection rigidly secured to the frame-work, the continued rocking movement of the shaft 21 causing the upper end portion of the member 119 to contact with a depending member 120 rigidly secured to the link 92, thus forcing said link 92 and member 88 rearwardly against the tension of the coiled spring 90 until the member 88 is engaged by the hooked end portion of the arm 87, said rearward movement of the link causing a rocking movement to the shaft 60 and moving the resilient arms 59 to their original or initial position as will be seen by reference to Figs. 7 and 8.

The slidable horizontally movable table 121 is mounted at each side thereof upon L-shaped metallic guide rails or bars 122 suitably mounted on the frame-work and extending rearwardly beyond the frame-work, said table being provided with two pairs of forwardly projecting metallic fingers 123 extending normally to a point adjacent the stationary shear member, and between each pair of fingers is formed a slot 124 for the passage of the resilient arms 59 hereinbefore described, each finger having an integral depending flange 125 formed thereon which overlaps the longitudinal bars 46, carried by the auxiliary frame, which flanges 125 serve as auxiliary guide-ways for the moving table. Secured to the outer face of each of the outer side fingers is a rigidly fixed lateral extension 126, provided with an upright flange 127, and pivotally secured to said extension 126, is a bell-crank lever 128, to one end of which is pivotally connected one end of a link 129, the other end of said link being connected to one end of a bell-crank lever 130, which is pivotally connected to the table 121, the other end of said bell crank lever 130 being pivotally connected to a link 131, said links 131 being pivotally connected together at their meeting ends, and one of the links 131, having an opening 132 formed therethrough, to which is fixedly secured one end of a suitable cable or cord 133 leading to the rear of the machine, the other end of the cable or cord being fixedly secured to a suitable weight 134 for the purpose hereinafter described. Fixedly secured to the outer face of each outside finger in advance of the extension 126 is another lateral extension 135 to which is pivotally secured a yielding lever 136, the rear end of said lever 136 being adapted to engage the free end of the bell crank lever 128, while the forward end of said lever is provided with an upright extension or finger 137, and engaging the forward end portion of said lever 136 is a spring member 138, which is fixedly secured at one end to the extension 135, the lever 136 being yieldably supported to suit the different widths of sheets, and at the same time being adapted to engage the edges of the sheet to carry the doubled sheet rearwardly with the table, as will be readily understood.

Figure 17:
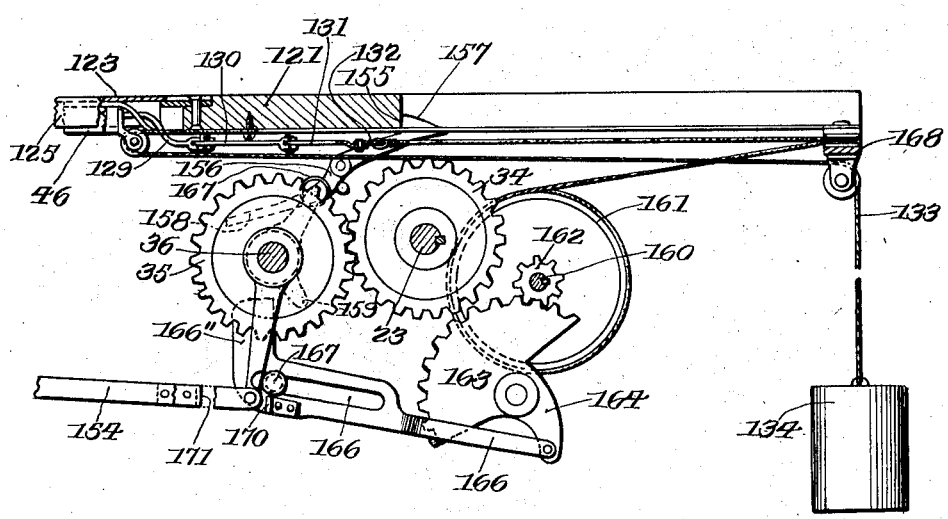
Fig. 17, is an enlarged sectional detail of the mechanism connected with and for operating the slidably movable table.

The table is provided with slotted portions 137 adapted to receive suitable adjusting means for laterally adjusting the metallic fingers carried thereby, in order to suit the different adjustments of the auxiliary frame hereinbefore referred to. See Figs. 5, 17, 18 and 19.

Suitably secured to the underside of the removable cover at the front end of the machine is a device for gaging the amount to be sheared off the ragged end of the sheet, and consists of a rod 139 projecting through the front end of the machine, provided with a handle for manipulating the said rod, which is provided with a screw-threaded inner end portion 140, adapted to engage with the inner screw-threaded tubular portion 141 carried at the inner end of a metallic bar 142, which passes through the central recessed portion 16 formed in the feed rolls, and the outer end of the bar 142 being provided with a V-shaped recess adapted to engage with the forward end of the metal sheet after the sheet has passed between the feed rolls, as hereinafter described.

When the machine has completed its doubling operation and the sheet is resting in a position to have its ragged ends sheared off, the initial downward movement of the pivoted shearing blade causes the projection 143, carried by said blade, to lift the overhanging end of the rocking member 144 carried by the frame, and through the medium of its connecting link 145, and the member 146 connecting to a rod 147 imparts a rocking movement to cam member 148 rigidly secured to said rod 147 and fitted through an opening 149 formed through a pivoted spring-pressed yielding member 149', thereby disengaging the hooked end portion of said member from the rack 150 and causing the upper toothed end portion of a quadrant 151, which is pivotally supported to a depending member 152, fixedly secured to the under side of the removable cover, said quadrant being in engagement with the rack 150, thus causing the gaging device to move forwardly under the tension of the coiled spring 153, one end of which is secured to the framework, and its other end to the upper portion of the quadrant 151. To the lower end of the quadrant is pivotally connected a long bar or link 154, which extends rearwardly and is connected to the operating mechanism in the manner and for the purpose hereinafter described.

The slidable table 121 is held in its forward normal position by means of the hooked end portion 155 of the lever catches 156, pivotally secured to the inner face of each side of the frame work, said levers being provided with an inclined upper face portion 157, and a rearwardly and downwardly depending member 158, which is adapted to engage with a cam member 159 fixedly secured to the driven shaft 36 near each end thereof, as the shaft rotates, and at the proper time cause the hooked end portion of each lever 156 to be depressed below the table thereby allowing its rearward movement.

Supported at the rear end portion of the frame is a shaft 160 to which is fixedly secured a drum 161 and a gear wheel 162, and meshing with said gear wheel 162 is a section gear 163 pivotally supported by an upright member 165 rigidly secured to the frame-work, said section gear 163 having a depending member 164, to the lower end of which is pivotally secured one end of a member 166 provided with a slotted portion 166', through which passes a pin 167, carried by a member 168 suitably secured to the framework, said pin serving to secure the forward end of the member 166 and guide said member in its forward and rearward movement. Said member 166 is provided at its forward end portion with an upright extension 166'', which, at the proper time, as the shaft 36 rotates is caused to engage with the roller 167 fixedly secured to said shaft, thus imparting a forward movement to the member 166 and causing a rearward movement of the gear section 163, imparting a rotary movement to the gear wheel 162 and the drum 161, thereby winding the cable or rope, see Fig. 5, which passes around the loose pulleys supported by the cross bar 168 at the rear of the machine, around the drum, thus causing the slidable table carrying the doubled and sheared sheet to move to the rear end of the machine, from whence it is delivered to the heating furnace. It will be readily understood that since one end of the cable or rope is fixedly secured to the table and the other end to the weight, that when the cable is wound around the drum it causes the table to slide horizontally rearward and the weight to be elevated and at the same time causing the upright extensions or fingers 137 to be moved inward to grasp the side edges of the sheet through the connection of the cable 133 with the links 131, bell crank levers 130, links 129 and bell crank levers 128, and thus convey the doubled sheet rearwardly with the table.

It will be perceived that simultaneously with the starting of the winding movement of the cable 133 on the drum 161 to cause the rearward movement of the table carrying the doubled sheet, the forward movement of the member 166 causes the extension 170 fixedly secured to the member 166 to engage with a fixed extension 171 at the rear end portion of the long bar or link 154, thereby imparting a forced forward movement to said link 154, which in turn imparts a rearward movement to the pivoted quadrant 151, and the gear teeth of the quadrant being in mesh with the teeth formed on the rack 150, a rearward movement is imparted to said rack against the tension of the spring 153, until the rear tooth of the rack is engaged by the snapping of the hooked end portion of the member 149' into contact therewith, this rearward movement of the said parts carries the gaging bar 142 rearward through the recessed central opening formed in the feed rolls, so that its V-shaped or recessed end will engage the forward central end portion of the sheet or pack which has passed through the feed rolls and feed the sheet to the shearing blade to the desired extent predetermined by the proper adjustment of the gage bar, which has been adjusted to suit the ragged ends of the sheet and reduce the waste to a minimum, at which time the shearing off operation of the ragged ends of the sheet or pack is performed by the continued downward movement of the pivoted shear blade with relation to the stationary or fixed shear bar or blade. Immediately following the shearing off the ends of the sheet the continued forward movement of the member 166 imparts the required rearward movement to the movable table when the double pack is removed and the table caused to immediately resume its forward initial position through the medium of the weight 134 and cable connected thereto at one end, with its other end secured to the under side of the table, as will be readily understood by reference to Figs. 5 and 17 of the drawings.

The vertically reciprocating compressing frame 41 supported by the frame-work is provided with a platen member 176 adapted to flatten the doubled sheet, and having a forward integral extension 177, beneath which the sheet or pack is fed, and to the rear central portion of the platen is fixedly secured an upright metallic loop bar 178. Secured to the rear face of the uprights 66 are two transverse metal bars 180, and to the central portion of each bar 180 is fixedly secured one end of a metal plate 181, having a central rear upright slot 182 throughout its height, through which slot extends the rear arm 183 of a hammer 184, pivotally secured to the fixed member 185 carried by the uprights and positioned centrally between said uprights. To the said bars 180 is also fixedly secured in any suitable manner a metallic casing 186 within which is a coiled spring 191 with its upper end resting in contact with the rear arm 183 of the hammer, and pivotally secured to a rigid extension 187 carried by the front face of said casing 186, is a lever 188 having a depending arm 189, and an upper hooked end portion 190 adapted to engage the upper face of the rear arm 183 of the hammer and thereby retain the hammer 184 in its elevated position until the compressing frame has completed its operation, and the platen 176 is returned to its extreme uppermost position at which time the upper surface of said platen will engage the depending arm 189 of the lever 188, thereby rocking the hooked end portion 190 from engagement with the rear arm of the hammer, when the coiled spring under tension will force the hammer 184 suddenly downward into contact with the free end of the lever 79, thus through its connection with the clutch, releasing the said clutch and automatically stopping further movement of the doubling mechanism until another sheet or pack is fed through the feed rolls and the clutch caused to be automatically thrown into engagement for a repetition of the doubling operation.

It will be observed that the fixed depending projection 58 carried by the movable shearing blade depresses the pivoted plate 55 during the shearing operation sufficiently to let the waste material to fall out of the way before the said plate is returned by its spring to its initial or normal position.

Fixedly secured at each side of the front end portion of the compressing frame 41, is a metal bar 192 provided at its upper end with a hooked portion 193 which is adapted to engage with the side bars 65 when the compressing platen is approaching its lowermost position, and when said platen reaches its lowermost position, said hooked end portion 193 depresses the bars 65, thus depressing the vertically movable frame 67 until the pawl 62 engages the upper surface of the bar 64, thereby returning and locking said frame 67 in its lowermost or initial position.

The operation of my improved doubling mechanism may be briefly described as follows:

Assuming that the blank sheet or pack is delivered from the rolling mill substantially in the form shown in Fig. 28 with a slightly rounded rear end portion and a forward ragged end portion curved inwardly at its central portion, and the attendant having suitably adjusted the gage bar 142 and the gaging bar 71' in order to determine and reduce to a minimum the amount of waste to be sheared off the ends, the sheet is then fed between the continuously rotating feed rolls the rear end of the sheet engaging with the rearwardly and upwardly curved resilient fingers thereby guiding its side edges upwardly and between the clamping jaws of the pinching mechanism, the further upward movement of the sheet causing its central portion to engage the lower extended end portion of the pawl 62 thereby disengaging said pawl, when a sudden upward movement is imparted to the frame 67 causing its member 78 to engage and lift the overhanging end of member 79, which action causes the clutch member to be shifted into engagement with the driving means thereby imparting motion to the doubling mechanism, and at the same time the overhanging end of member 82 is also lifted thus simultaneously operating the means for shifting the resilient fingers out of the path of the moving sheet. The doubling mechanism now being in operation the mechanism is so timed that the segment gear 19 carried by the mutilated gear wheel 18 will engage with the teeth of the sectional gear wheel 20, thereby imparting a forward rocking movement to the rock shaft 21, which movement of the said rock-shaft causes the jaws of the pincher mechanism to grasp each edge of the sheet, and carry a portion of said sheet forward, as the sheet is being fed rearwardly beneath the downwardly moving compressing platen, until the pincher mechanism reaches the horizontal position shown by dotted lines Fig. 6, in which position the pincher mechanism is temporarily held by the overlapping hooked end portion of the pawls 105, with its movable member released from contact with the sheet by means of the tension of the plate spring 103, while the continued downward movement of the compressing platen serves to compress the sheet into its doubled condition, when the mechanism is so timed that an initial downward movement being imparted to the movable shearing blade causes the projection 143 carried by the blade to engage the rocking member 144 thus imparting a rocking movement to said member, which movement releases the rack 150 thereby causing the gaging bar to move forwardly under the tension of the coiled spring 153, at which time the roller 167 fixedly secured to the driven shaft 36 engages with the upright 166″ formed on member 166, thus causing the member to move forwardly with its extension 170, in contact with extension 171 formed at the rear of the bar or link 154, thereby imparting a forward movement to the bar or link, this imparting a rearward movement of the gaging bar 142 between the recessed central portion of the feed rolls, causing the rear V-shaped end portion of said bar 142 to engage with the ragged end portion of the sheet or pack and push it rearwardly to its proper position with respect to the downwardly moving shear blade, when the continued downward movement of said blade will shear off the ragged ends of the sheet, and simultaneously the lever catches 156 will be depressed below the bottom of the rearwardly slidable table, and the continued forward movement of the member 166 will cause the cable to be wound around the drum 161, thereby moving the table attached to the cable rearwardly, carrying with it the doubled sheet, at the same time winding up the weight secured to the other end of the cable, this rearward movement of the table causes the gripping fingers carried by the table to engage with and true the edges of the sheet as it is carried rearwardly, and as soon as the table reaches its rearward limit, and the doubled sheet or pack removed, the table is returned to its initial position by the downward movement of the weight, while the compressing platen is moving upward, and just before it reaches its uppermost position the fixed extension 31 carried by the gear wheel 22 engages the spring-pressed pawl 32, disengaging said pawl from the teeth of the sectional gear wheel 20, when immediately a reverse rocking movement will be imparted to the rock-shaft 21 by the tension of the coiled spring 95′, which action of the rock-shaft returns the pinching mechanism and the resilient fingers to their normal or initial position, and when the compressing platen reaches its extreme uppermost position the upper surface of the platen engages the depending end portion 189 of the lever 188, releasing its hooked end portion 190 from engagement with the rear arm of the hammer 184, when the hammer is caused to move suddenly downward by the tension of the coiled spring 191 and strike the overhanging free end of the lever 79, which through its connection with the clutch will disengage the clutch from the driving mechanism, thereby automatically throwing the doubling mechanism out of operation, until another sheet or pack is fed between the feed rolls and caused to automatically shift the clutch into engagement with the driving mechanism thereby starting the doubling mechanism for a repetition of the doubling operation such as hereinbefore described.

Having thus described my invention, what I claim and desire to secure by Letters Patent is:

1. A doubling machine for tin sheets or packs, comprising a framework, doubling mechanism, a pair of continuously rotating feed rolls supported by the framework, a pair of upwardly and rearwardly curved resilient arms for guiding the sheets, and vertically movable means automatically disengaged by the upward movement of each sheet for starting the operation of the doubling mechanism.

2. A doubling machine for tin sheets or packs, comprising a framework, doubling mechanism, a pair of continuously rotating feed rolls mounted on said framework, a pair of upwardly and rearwardly curved resilient arms for guiding the sheets, said arms being fixedly secured to a rock-shaft, and vertically movable means automatically disengaged by the upward movement of each sheet for starting the operation of the doubling mechanism.

3. A machine for doubling tin sheets or packs, comprising a framework, a pair of continuously rotating feed rolls mounted on said framework, a pair of upwardly and rearwardly extending resilient arms adapted to guide each sheet upwardly and rearwardly, pincher mechanism pivotally mounted so as to grip each side edge of the sheet and double it, and vertically movable means automatically disengaged by the upward movement of each sheet for starting the operation of the doubling mechanism.

4. A machine for doubling the sheets or packs comprising a framework, a pair of continuously rotating feed rolls mounted on the framework, a pair of upwardly and rearwardly extended resilient arms fixedly mounted on a rock-shaft and adapted to guide each sheet upwardly and rearwardly, upright pincher mechanism pivotally mounted so as to grip each side edge of the sheet and double it and swing into a horizontal position, and vertically movable means automatically disengaged by the upward movement of each sheet for starting the operation of the doubling mechanism.

5. A machine for doubling tin sheets or packs, comprising a frame-work, continuously rotating feed-rolls mounted on the frame-work, means for guiding each sheet upwardly and rearwardly, upright pinching mechanism pivotally mounted and adapted to grip each side edge of the sheet and double it and swing into a horizontal position, and vertically movable means mounted on the framework automatically disengaged by the upward movement of each sheet for starting the operation of the doubling mechanism.

6. A machine for doubling tin sheets or packs, comprising a framework, doubling mechanism, sheet feeding means mounted on the framework, means for guiding each sheet upwardly and rearwardly, vertically movable means automatically disengaged by the upward movement of each sheet for starting the operation of the doubling mechanism, and means for automatically moving the sheet guiding means to its lowermost position.

7. A machine for doubling tin sheets or packs, comprising a framework, sheet feeding means mounted on the framework, upwardly and rearwardly extended means for guiding each sheet, upright pivotally mounted pincher mechanism, vertically movable means automatically disengaged by the upward movement of each sheet for starting the operation of the pincher mechanism, means for automatically moving the sheet guiding means to its lowermost position, and means for automatically swinging the pincher mechanism into a horizontal position.

8. A machine for doubling tin sheets or packs, comprising a framework, sheet feeding means mounted on the framework, upwardly and rearwardly extended means for guiding each sheet, upright pivotally mounted pincher mechanism, vertically movable means mounted on said framework automatically disengaged by each sheet in its upward movement for starting the operation of the pincher mechanism, means for automatically moving the sheet guiding means into its lowermost position, a rock-shaft connected with the pincher mechanism, and means for automatically swinging the pincher mechanism into a horizontal position.

9. A machine for doubling tin sheets or packs, comprising a frame-work, sheet feeding means mounted on the framework, means for guiding each sheet upwardly and rearwardly, upright pivotally mounted pincher mechanism, vertically movable means automatically disengaged by the upward movement of each sheet for starting the pincher mechanism, means for automatically swinging the sheet guiding means into its lowermost position, means for automatically swinging the pinching mechanism into a horizontal position, and means automatically operated for retaining the pincher mechanism in its horizontal position for a predetermined period.

10. A machine for doubling tin sheets or packs, comprising a frame-work, sheet-feeding means mounted on the frame-work, vibrating resilient arms for guiding each sheet upwardly and rearwardly, vibrating pincher mechanism pivotally mounted in an upright position, vertically movable means automatically disengaged by the upward movement of each sheet for starting the pincher mechanism, means for moving said resilient arms to their lowermost position out of the path of said sheet, means for automatically vibrating the pincher mechanism into a horizontal position, a press or platen whereby the doubled sheet is flattened, and means for automatically engaging said vertically movable means when the platen reaches its lowermost position.

11. A machine for doubling tin sheets or packs, comprising a frame-work, a pair of continuously rotating feed rolls mounted on the framework, each of said rolls being formed with a central annular recess, and a manually and automatically operated gage bar adapted to be passed through said recess to engage the forward end of each sheet.

12. A machine for doubling tin sheets or packs, comprising a framework, a pair of continuously rotating feed rolls mounted on the framework with a central annular recess formed in each roll, a manually and automatically operated gage bar mounted on the framework in front of said rolls adapted to be projected through said recess, and means connecting said gage bar to automatically operated means mounted at the rear of the framework.

13. A machine for doubling tin sheets or packs, comprising a frame-work, a pair of continuously rotating feed rolls mounted on the framework, gaging mechanism mounted at the front of said rolls adapted to be automatically operated, a vertically movable frame automatically disengaged by the upward feed of each sheet for starting the doubling mechanism, and adjustable gaging means mounted on said movable frame.

14. A machine for doubling tin sheets or packs, comprising a framework, a pair of continuously rotating feed rolls mounted in the frame-work with a central annular recess formed in each roll, gaging mechanism mounted on the frame-work at the front of said rolls, means for guiding the sheet upwardly and rearwardly, vertically movable means disengaged by the upward movement of each sheet for starting the doubling mechanism, and adjustable gaging means mounted on said movable means.

15. A machine for doubling tin sheets or packs, comprising a frame-work, a pair of continuously rotating feed rolls, each roll formed with a central annular recess, a gaging bar adapted to pass through said recess, means operated by the upwardly moving sheet for starting the doubling mechanism, automatically operated sheet shearing means, means connected with the shearing means for automatically causing a forward movement of the gaging bar, and automatically operated means for imparting a rearward movement to said gaging bar.

16. A machine for doubling tin sheets or packs, comprising a framework, a pair of continuously rotating feed rolls, each roll formed with a central recess therein, a gaging bar mounted on the frame-work in front of said rolls and adapted to pass through said recess, means operated by the upward movement of each sheet for starting the doubling mechanism, an adjustable gaging device mounted on said means, automatically operated shearing means, means for causing a forward movement to the gaging bar, and automatically operated means for imparting a rearward movement to said gaging bar.

17. A machine for doubling tin sheets or packs, comprising a frame-work, a pair of continuously rotating feed rolls mounted on the framework, an adjustable auxiliary frame mounted on said frame-work, upwardly and rearwardly extended resilient arms carried by the framework and adapted to guide the sheet upwardly and rearwardly, doubling mechanism, vertically movable means automatically disengaged by the upward movement of each sheet for starting the doubling mechanism, and automatically operated means for engaging said movable means and restoring it to its initial position.

18. A machine for doubling tin sheets or packs, comprising a framework, a pair of continuously rotating feed rolls mounted on the framework, an adjustable auxiliary frame mounted on said framework, means for laterally adjusting the auxiliary frame, means for guiding the sheet upwardly and rearwardly, doubling mechanism, vertically movable means automatically disengaged by the upward movement of each sheet for starting the doubling mechanism, and automatically operated means for engaging the movable means and returning it to its initial position.

19. A machine for doubling tin sheets or packs, comprising a framework, a pair of continuously rotating feed rolls, an adjustable auxiliary frame, means for laterally adjusting said auxiliary frame, automatically operated means for guiding the sheet upwardly and rearwardly, doubling mechanism, vertically movable means automatically disengaged by the upward movement of the sheet for starting the doubling mechanism, automatically operated means for restoring said movable means to its initial position, and means for locking the movable means in its initial position.

20. A machine for doubling tin sheets, comprising a framework, a pair of continuously rotating feed rolls, an adjustable auxiliary frame mounted on said framework, means for guiding the sheet upwardly and rearwardly, vertically movable means automatically disengaged by the upward movement of each sheet for starting the pincher mechanism, upright pincher mechanism having a rigid member pivotally secured at each side of the auxiliary frame and a member pivotally secured to the rigid member and connected to a rock-shaft mounted on the framework, and means automatically operated to cause the clamping jaws of the pincher mechanism to grip each side edge of the sheet and double it into a horizontal position.

21. A machine of the character described, comprising a framework, sheet-feeding mechanism mounted in the framework, means for guiding the sheet upwardly and rearwardly, vertically movable means automatically disengaged for starting the pincher mechanism, means for automatically rocking the sheet guiding means to its uppermost and lowermost positions, upright pincher mechanism pivotally mounted, and automatically operated means for rocking the pinch mechanism from its upright to a horizontal position.

22. A machine of the character described, comprising a framework, sheet feeding means mounted on the framework, vibratory resilient arms for guiding each sheet upwardly and rearwardly, vertically movable means automatically disengaged by the upward movement of the sheet for starting the pinching mechanism, vibratory pinching mechanism adapted to grip each side edge of the sheet and double it, means for automatically operating the said arms at intervals, and means for automatically operating the pinching mechanism at intervals.

23. A machine of the character described, comprising a framework sheet feeding means mounted on the framework, resilient arms fixedly secured to a rock-shaft, said shaft being mounted on said framework, pincher mechanism pivotally mounted and operated by a rock-shaft, vertically movable means automatically disengaged by the upward movement of the sheet for starting the pincher mechanism, means for automatically rocking said resilient arms, and means for automatically moving the pincher mechanism from the upright to a horizontal position.

24. A machine of the character described, comprising a frame-work, sheet feeding means mounted on the framework, automatically operated means for guiding each sheet upwardly and rearwardly, automatically operated pincher mechanism for gripping each side edge of the sheet, means automatically operated by the upward movement of each sheet for starting the pincher mechanism, a press or platen adapted to flatten the doubled sheet, and an automatically operated horizontally slidable table adapted to convey the doubled sheet rearwardly.

25. A machine of the character described, comprising a framework, sheet feeding means mounted on the framework, automatically operated means for guiding each sheet upwardly and rearwardly, automatically operated pincher mechanism adapted to grip each side of the sheet, vertically movable means automatically disengaged by the upper end of the sheet to start the pincher mechanism, a vertically movable press or platen adapted to flatten the doubled sheet, and means fixedly secured to said platen for returning the movable means to its initial position.

26. A machine of the character described, comprising a framework, sheet feeding means mounted on the framework, means for guiding each sheet upwardly and rearwardly, means for gripping each side edge of the sheet and double it, means automatically operated by the upper moving edge of each sheet for starting the doubling mechanism, and an automatically operated horizontally slidable table adapted to carry the doubled sheet rearwardly and then automatically return to its initial position.

27. A machine of the character described, comprising a framework, sheet feeding means mounted on the framework, means for guiding the sheet upwardly and rearwardly, doubling mechanism, vertically movable means automatically disengaged by the upward movement of the sheet to start the doubling mechanism, a vertically movable press or platen adapted to flatten the doubled sheet, means for automatically moving a slidable table rearwardly, and means for automatically returning said slidable table to its initial position.

28. A machine of the character described, comprising a framework, sheet feeding means mounted on the framework, means for guiding the sheet upwardly and rearwardly, pivotally mounted pincher mechanism adapted to grip each side edge of the sheet and double it, vertically movable means automatically disengaged by the upward movement of each sheet to start the doubling mechanism, means for automatically shifting a horizontally slidable table rearwardly, and means for automatically returning said table to its initial position.

29. A machine of the character described, comprising a framework, sheet feeding means mounted on the framework, doubling mechanism, vertically movable means mounted on said framework and automatically disengaged by the upward movement of each sheet, vertically reciprocating means adapted to flatten the double sheet, automatically operated means connected to a slidable table to convey the doubled sheet rearwardly, and automatically operated means adapted to restore said table to its initial position.

30. A machine of the character described, comprising a framework, sheet feeding means mounted on the framework, doubling mechanism, vertically movable means automatically disengaged by the upward movement of each sheet to start the doubling mechanism, vertically reciprocating means for flattening the doubled sheet, means for restoring said vertically movable means to its engaged position, a horizontally slidable table automatically operated to convey the doubled sheet rearwardly, and automatically operated means to restore the table to its initial position.

31. A machine of the character described, comprising a framework, sheet feeding means mounted on the framework, doubling mechanism, vertically movable means automatically disengaged by the upward movement of each sheet to start the doubling mechanism, an automatically operated horizontally slidable table, and means carried by said table for gripping and truing the edges of the doubled sheet.

32. A machine of the character described, comprising a framework, sheet feeding means mounted on the framework, doubling mechanism, vertically movable means automatically disengaged by the upward movement of each sheet to start the doubling mechanism, an automatically rearwardly and forwardly moving horizontally slidable table, and means fixedly secured at each side of said table for gripping and truing the side edge of the doubled sheet.

33. A machine of the character described, comprising a framework, sheet feeding means mounted on the framework, doubling mechanism, vertically movable means automatically disengaged by the upward movement of each sheet for starting the doubling mechanism, vertically reciprocating means adapted to flatten the doubled sheet, an automatically operated rearwardly and forwardly moving horizontally slidable table, and yielding means fixedly secured at each side of the table adapted to grip and true the side edges of the doubled sheet.

34. A machine of the character described, comprising a framework, sheet feeding means mounted on the framework, doubling mechanism, vertically movable means automatically disengaged by the upward movement of each sheet for starting the doubling mechanism, a vertically movable press or platen adapted to flatten the doubled sheet, vertically extended means fixedly secured to said platen adapted to restore said vertically movable means to its initial engaged position when the platen reaches its lowermost position, a horizontally slidable table adapted to be automatically moved to its rearward and forward positions, and means fixedly secured to said table for gripping and truing the side edges of the doubled sheet.

35. A machine of the character described, comprising a framework, sheet-feeding means mounted on the framework, doubling mechanism, vertically movable means automatically disengaged by the upward movement of each sheet for starting the doubling mechanism, automatically operated vertically reciprocating means adapted to flatten the doubled sheet, a horizontally slidable table automatically shifted to its rearmost and foremost positions, automatically operated catches adapted to secure the table in its foremost position, and automatically operated means fixedly secured to the table for gripping and truing the side edges of the doubled sheet.

36. A machine of the character described, comprising a framework, sheet feeding means mounted on the framework, doubling mechanism, vertically movable means automatically disengaged by the upward movement of each sheet for starting the doubling mechanism, a vertically reciprocating platen adapted to flatten the doubled sheet, a forwardly and rearwardly moving automatically operated horizontally slidable table, automatically operated means for securing and releasing said table, and yielding means fixedly secured to each side of the table and automatically operated to grip and true the sides of the doubled sheet.

37. A machine of the character described, comprising a framework, sheet feeding means mounted on the framework, a doubling mechanism, a vertically movable frame automatically disengaged by the upward movement of each sheet for starting the doubling mechanism, a vertically reciprocating platen adapted to flatten the doubled sheet, automatically operated means adapted to convey the sheet rearwardly, and means operated by the uppermost movement of said platen for stopping the doubling mechanism.

38. A machine of the character described, comprising a framework, sheet feeding mechanism mounted on the framework, doubling mechanism, vertically movable means automatically disengaged by the upward movement of each sheet for starting the doubling operation, vertically reciprocating means adapted to flatten the doubled sheet, means fixedly secured to said reciprocating means for restoring the said movable means to its initial position, means for holding the movable means in its initial position until released by the moving sheet, and means automatically operated by the extreme upward movement of the reciprocating means for stopping the doubling mechanism.

39. A machine of the character described, comprising a framework, sheet feeding means mounted on the framework, doubling mechanism, automatically operated resilient means for guiding each sheet upwardly and rearwardly, vertically movable means disengaged by the upward movement of each sheet for starting the pincher mechanism, automatically operated pincher mechanism adapted to periodically grip and release the side edges of each sheet, an automatically reciprocating platen adapted to flatten the doubled sheet, and means automatically operated by the uppermost movement of the platen for stopping the doubling mechanism.

40. A machine of the character described, comprising a framework, sheet feeding mechanism mounted on the framework, means for guiding the sheet upwardly and rearwardly, doubling mechanism, vertically movable means automatically disengaged by the upward movement of each sheet, a plurality of uprights mounted on the framework for supporting said movable means, an automatically operated reciprocating platen adapted to flatten the doubled sheet, means fixedly secured to said platen for restoring the movable means to its initial position when the platen reaches its lowermost position, and means automatically operated by the platen when it reaches its uppermost position for stopping the doubling mechanism.

41. A machine of the character described, comprising a framework, continuously operated feed rolls mounted on the framework, an auxiliary frame mounted on said framework, provided with a plurality of uprights, a plurality of separated longitudinal bars secured to said uprights, means for laterally adjusting said auxiliary frame to different widths, a pair of resilient rearwardly and upwardly curved arms adapted to vibrate between said longitudinal bars and to guide the sheet upwardly and rearwardly, and vertically movable means automatically disengaged by the upward movement of each sheet to start the doubling mechanism.

42. A machine of the character described, comprising a framework, sheet feeding rolls mounted on the framework, an adjustable auxiliary frame mounted on said framework, means for laterally adjusting said auxiliary frame having a plurality of uprights, a plurality of separated longitudinal bars secured to said uprights, a pair of resilient arms curved upwardly and rearward fixedly secured to a rock shaft, said arms adapted to be automatically and periodically vibrated between said longitudinal bars, and vertically movable means automatically disengaged by the upward movement of each sheet for starting the doubling mechanism.

43. A machine of the character described, comprising a framework, sheet feeding rolls mounted on the framework, resilient means for guiding each sheet upwardly and rearwardly, means for automatically starting the pincher mechanism by the upward movement of each sheet, pivotally mounted pincher mechanism adapted to automatically grip each side of the sheet and convey a portion of the sheet into a horizontal or doubled condition, an automatically operated reciprocating platen adapted to flatten the doubled sheet, automatically and periodically operated means for releasing the pincher mechanism and returning it to its initial position, and means automatically operated by the platen for stopping the doubling mechanism.

44. A machine of the character described, comprising a framework, sheet feeding rolls mounted on the framework, a pair of resilient arms for guiding the sheet upwardly and rearwardly, means for automatically starting the pincher mechanism by the upward movement of each sheet, pincher mechanism adapted to grip the side edges of each sheet, means for automatically and periodically moving said resilient arms to both their uppermost and lowermost positions, means for automatically and periodically moving the pincher mechanism to both its uppermost and lowermost positions, and automatically and periodically operated means for stopping the doubling mechanism.

45. A machine of the character described, comprising a framework, doubling mechanism, sheet feeding rolls mounted on the framework, means for automatically starting the doubling mechanism by the upward movement of the sheet, an automatically operated reciprocating platen adapted to flatten the doubled sheet, and means automatically operated by the platen when it reaches its uppermost position for stopping the doubling mechanism.

46. A machine of the character described, comprising a framework, sheet feeding rolls mounted on the framework, rearwardly and upwardly curved resilient arms for guiding each sheet, means for automatically starting the pincher mechanism by the upward movement of each sheet, pincher mechanism pivotally mounted at each side of the sheet and adapted to grip each edge of the sheet and convey a portion of the sheet into a horizontal or doubled position, reciprocating means adapted to flatten the doubled sheet, and means automatically operated by said reciprocating means for stopping the doubling mechanism.

47. A machine of the character described, comprising a framework, doubling mechanism, sheet feeding rolls mounted on the framework, means for automatically starting the doubling mechanism by the upward movement of the sheet, means for automatically flattening the doubled sheet, means for automatically sliding a table rearwardly and forwardly, automatically operated means for securing and releasing said table, and means for automatically stopping the doubling mechanism.

48. A machine of the character described, comprising a frame-work, doubling mechanism, feeding rolls mounted on the framework, means for automatically starting the doubling mechanism by the upward movement of each sheet, an automatically reciprocating platen adapted to flatten the doubled sheet, a horizontally movable table, means for automatically and periodically moving said table rearwardly, means for automatically and periodically moving the table forwardly, means for automatically engaging and disengaging said table, and means automatically and periodically operated for stopping the doubling mechanism.

49. A machine of the character described, comprising a framework, sheet feeding rolls mounted on said framework, means for guiding the sheet upwardly and rearwardly, doubling mechanism, means for gripping each edge of the sheet and conveying a portion of the sheet into a horizontal or doubled position, means for automatically starting the doubling mechanism by the upward movement of each sheet, means for flattening the doubled sheet, means for conveying the doubled sheet rearwardly, and means for automatically and periodically stopping the doubling mechanism.

ARTURO VANNUCCI.

Witnesses:
 QUINTO VANNUCCI,
 PETER TINTORI.